(12) United States Patent
Barrett et al.

(10) Patent No.: US 11,917,085 B2
(45) Date of Patent: Feb. 27, 2024

(54) METHOD AND SYSTEM FOR REDUCED V2X RECEIVER PROCESSING LOAD USING CERTIFICATES

(71) Applicant: BlackBerry Limited, Waterloo (CA)

(72) Inventors: Stephen John Barrett, Haywards Heath (GB); John Octavius Goyo, Acton (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 18/305,069

(22) Filed: Apr. 21, 2023

(65) Prior Publication Data

US 2023/0269101 A1    Aug. 24, 2023

Related U.S. Application Data

(63) Continuation of application No. 17/741,800, filed on May 11, 2022, now Pat. No. 11,722,321, which is a
(Continued)

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/0825* (2013.01); *H04L 9/321* (2013.01);
(Continued)

(58) Field of Classification Search
CPC ..... H04L 9/3268; H04L 9/0825; H04L 9/321; H04L 9/3247; H04L 67/12; H04L 2209/84; H04W 4/40
See application file for complete search history.

(56) References Cited

U.S. PATENT DOCUMENTS 6,233,341 B1 * 5/2001 Riggins ............... H04L 63/0823
713/175
7,685,629 B1 * 3/2010 White ..................... H04L 63/18
713/184
(Continued)

FOREIGN PATENT DOCUMENTS

| CN | 103269272 A | 5/2013 |
|---|---|---|
| CN | 106713326 A | 5/2017 |
| WO | WO2008115988 A1 | 9/2008 |

OTHER PUBLICATIONS

Chinese Patent Application No. 201910476638.5 First Review of the Opinion Circular, dated Apr. 27, 2023.
(Continued)

*Primary Examiner* — Gary S Gracia
(74) *Attorney, Agent, or Firm* — Moffat & Co

(57) ABSTRACT

A method at a computing device within an Intelligent Transportation System, the method comprising: determining, at the computing device, whether a short-term certificate is available to sign a message; if the short-term certificate is available, signing the message with a private key associated with the short-term certificate; if the short-term certificate is not available, signing the message with a private key associated with a long-term certificate; and sending the message to a recipient.

20 Claims, 13 Drawing Sheets

Related U.S. Application Data continuation of application No. 17/073,529, filed on Oct. 19, 2020, now Pat. No. 11,356,284, which is a continuation of application No. 16/001,600, filed on Jun. 6, 2018, now Pat. No. 10,868,677.

(51) Int. Cl.
  *H04W 4/40* (2018.01)
  *H04L 67/12* (2022.01)

(52) U.S. Cl.
  CPC ............. *H04L 9/3247* (2013.01); *H04W 4/40* (2018.02); *H04L 67/12* (2013.01); *H04L 2209/84* (2013.01)

(56) References Cited

U.S. PATENT DOCUMENTS

| | | | | |
|---|---|---|---|---|
| 7,865,937 | B1* | 1/2011 | White | G06Q 20/3674 713/184 |
| 8,171,283 | B2* | 5/2012 | Pietrowicz | H04L 9/3268 713/156 |
| 8,245,044 | B2* | 8/2012 | Kang | G06Q 20/12 713/176 |
| 8,255,278 | B1* | 8/2012 | Young | G06Q 20/206 705/17 |
| 9,027,085 | B2* | 5/2015 | Kula | H04L 9/3228 726/4 |
| 9,373,110 | B2* | 6/2016 | Sekiya | G06Q 20/388 |
| 9,652,771 | B2* | 5/2017 | Fisher | G06Q 20/3552 |
| 9,654,298 | B2* | 5/2017 | Engberg | H04L 9/3268 |
| 9,667,626 | B2* | 5/2017 | Lin | H04L 63/0815 |
| 9,740,375 | B2* | 8/2017 | Kruglick | G06F 3/0484 |
| 10,032,156 | B2* | 7/2018 | Al-Sahli | G06Q 20/1085 |
| 10,032,168 | B2* | 7/2018 | Kulkarni | A61L 31/145 |
| 10,089,607 | B2* | 10/2018 | Ziat | G06Q 20/3227 |
| 10,354,303 | B1* | 7/2019 | Ran | G06Q 30/0609 |
| 10,445,741 | B2* | 10/2019 | Cueli | G06Q 20/12 |
| 10,515,360 | B2* | 12/2019 | Chow | G06K 7/10366 |
| 10,579,996 | B2* | 3/2020 | Neuwirth | G06Q 20/382 |
| 10,846,695 | B2* | 11/2020 | Kim | G06Q 20/10 |
| 10,951,418 | B1* | 3/2021 | Graziano | H04L 9/3263 |
| 11,317,279 | B2* | 4/2022 | Wolosewicz | H04L 63/123 |
| 11,321,730 | B2* | 5/2022 | Bain | G06Q 30/0238 |
| 11,348,077 | B2* | 5/2022 | Naik | G06Q 20/1085 |
| 2003/0097592 | A1* | 5/2003 | Adusumilli | H04L 69/08 713/168 |
| 2007/0277248 | A1* | 11/2007 | Agrawal | G06F 8/60 726/30 |
| 2009/0106556 | A1* | 4/2009 | Hamid | H04L 63/18 713/176 |
| 2009/0228703 | A1* | 9/2009 | Grajek | H04L 63/0823 713/156 |
| 2009/0235074 | A1* | 9/2009 | Salgarelli | G06Q 20/20 713/168 |
| 2010/0031025 | A1* | 2/2010 | Zhang | H04L 63/0823 713/156 |
| 2010/0031030 | A1* | 2/2010 | Kao | H04W 12/069 713/156 |
| 2010/0188991 | A1* | 7/2010 | Raleigh | H04M 15/49 370/252 |
| 2011/0035788 | A1* | 2/2011 | White | G06F 21/577 726/4 |
| 2011/0061095 | A1* | 3/2011 | Wiseman | G06Q 20/12 709/227 |
| 2011/0153479 | A1 | 6/2011 | Liu | |
| 2011/0214178 | A1* | 9/2011 | van den Berg | H04W 12/122 726/22 |
| 2011/0231911 | A1* | 9/2011 | White | G06F 21/32 726/7 |
| 2011/0302646 | A1* | 12/2011 | Ronda | H04L 9/3268 726/9 |
| 2012/0191557 | A1* | 7/2012 | Fisher | G06Q 20/102 705/21 |
| 2012/0274444 | A1* | 11/2012 | Micali | G07C 9/22 340/5.65 |
| 2013/0007444 | A1 | 1/2013 | Dare | |
| 2013/0166450 | A1* | 6/2013 | Pama | H04L 63/18 455/411 |
| 2013/0226812 | A1* | 8/2013 | Landrok | G06Q 20/40145 705/67 |
| 2014/0006788 | A1* | 1/2014 | Ignatchenko | H04L 9/3263 713/175 |
| 2014/0207676 | A1* | 7/2014 | van Wel | H04L 67/61 705/44 |
| 2014/0245391 | A1* | 8/2014 | Adenuga | G06Q 20/40145 726/3 |
| 2014/0310185 | A1* | 10/2014 | Stafflin | G06Q 20/3227 705/71 |
| 2014/0344056 | A1* | 11/2014 | Maller | H04L 9/321 713/150 |
| 2016/0098711 | A1* | 4/2016 | Patel | G07F 9/002 705/44 |
| 2016/0125407 | A1* | 5/2016 | Stafford | H04L 63/0853 705/75 |
| 2016/0132883 | A1* | 5/2016 | Evans | G06Q 40/03 705/44 |
| 2016/0247144 | A1* | 8/2016 | Oh | G06K 7/083 |
| 2016/0253669 | A1* | 9/2016 | Yoon | G06Q 20/327 705/75 |
| 2016/0280370 | A1 | 9/2016 | Canavor | |
| 2016/0285864 | A1 | 9/2016 | Canavor | |
| 2016/0307194 | A1* | 10/2016 | Bhatnagar | H04L 63/0838 |
| 2016/0344725 | A1* | 11/2016 | Severin | H04L 63/0823 |
| 2017/0017957 | A1* | 1/2017 | Radu | G06Q 20/4012 |
| 2017/0243485 | A1* | 8/2017 | Rubin | H04W 4/46 |
| 2017/0286966 | A1* | 10/2017 | Kohli | G06Q 20/407 |
| 2017/0317837 | A1* | 11/2017 | Alrawais | H04L 9/3297 |
| 2017/0359365 | A1* | 12/2017 | van den Berg | H04W 4/20 |
| 2017/0364897 | A1* | 12/2017 | Sarkar | G06Q 30/0643 |
| 2017/0364911 | A1* | 12/2017 | Landrok | G06Q 20/385 |
| 2018/0130548 | A1* | 5/2018 | Fisher | G06Q 20/3227 |
| 2018/0240339 | A1* | 8/2018 | Moisio | H04W 12/10 |
| 2018/0242127 | A1 | 8/2018 | Kwoczek | |
| 2018/0278427 | A1* | 9/2018 | Thakore | H04L 9/3268 |
| 2018/0375853 | A1 | 12/2018 | Jungk | |
| 2019/0095835 | A1* | 3/2019 | Jarvis | G06Q 10/06 |
| 2019/0158489 | A1 | 5/2019 | Ben Henda | |
| 2019/0379548 | A1 | 12/2019 | Barrett | |
| 2020/0029268 | A1* | 1/2020 | Russell | H04W 12/06 |
| 2020/0106624 | A1* | 4/2020 | Russell | H04W 12/37 |
| 2020/0220737 | A1* | 7/2020 | Ryu | G06F 16/29 |
| 2021/0176080 | A1* | 6/2021 | Li | H04W 12/043 |

OTHER PUBLICATIONS

Chinese Patent Application No. 2023042700044720, First Review of the Opinion Circular, dated Apr. 27, 2023.

IEEE Standards Association, IEEE Standard; IEEE 1609.2-2016: "IEEE Standard for Wireless Access in Vehicular Environments—Security Services for Applications and Management Messages", published Mar. 1, 2016.

IEEE Standards Association, IEEE Standard; IEEE 802.11p-2010: "IEEE Standard for Information technology—Local and metropolitan area networks—Specific requirements—Part 11: Wireless LAN Medium Access Control (MAC) and Physical Layer (PHY) Specifications—Amendment 6: Wireless Access in Vehicular Environments", published Jul. 15, 2010.

European Telecommunications Standards Institute, European Standard; ETSI EN 302 665: "Intelligent Transport Systems (ITS); Communications Architecture", No. V1.1.1, Sep. 2010.

Internet Engineering Task Force, Request for Comments; IETF RFC 6960: "X.509 Internet Public Key Infrastructure Online Certificate Status Protocol—OCSP", Jun. 2013.

Internet Engineering Task Force, Request for Comments; IETF RFC 6066: "Transport Layer Security (TLS) Extensions: Extension Definitions", Jan. 2011.

Internet Engineering Task Force, Request for Comments; IETF RFC 6961: "The Transport Layer Security (TLS) Multiple Certificate Status Request Extension", Jun. 2013.

(56) References Cited

OTHER PUBLICATIONS

European Telecommunications Standards Institute, European Standard; ETSI EN 302 637-2: "Intelligent Transport Systems (ITS); Vehicular Communications; Basic Set of Applications; Part 2: Specification of Cooperative Awareness Basic Service", No. V1.3.2, Nov. 2011.

European Telecommunications Standards Institute, European Standard; ETSI EN 302 637-3: "Intelligent Transport Systems (ITS); Vehicular Communications; Basic Set of Applications; Part 3: Specifications of Decentralized Environmental Notification Basic Service", No. V1.2.2, Nov. 2011.

William Whyte, Andre Weimerskirch, Virendra Kumar and Thorsten Hehn, "A security credential management system for V2V communications", 2013 IEEE Vehicular Networking Conference, pp. 1-8.

Camp LLC—Vehicle Safety Communications 5 Consortium, "Security Credential Management System Proof-of-Concept Implementation: EE Requirements and Specifications Supporting SCMS Software Release 1.1", May 4, 2016.

Camp LLC—Vehicle Safety Communications 5 Consortium, "Security Credential Management System Proof-of-Concept Implementation: EE Requirements and Specifications Supporting SCMS Software Release 1.2.2", Nov. 15, 2016.

American National Standards Institute, ANSI X9.62: "Public Key Cryptography for the Financial Services Industry: The Elliptic Curve Digital Signature Algorithm (ECDSA)", 2005 Edition, published Nov. 16, 2005.

Certicom Research, "Standards for Efficient Cryptography—SEC 1: Elliptic Curve Cryptography", Version 2.0, May 21, 2009.

SAE International, J2945 Standard: "On-Board System Requirements for V2V Safety Communications", Mar. 2016.

Benedikt Brecht, Camp Misbehaviour report ASN.1, https://stash.campllc.org/projects/SCMS/repos/scms-asn/browse/ee-ma.asn?at=refs%2Fheads%2Fmaster, Feb. 19, 2018.

US Department of Transportation, "Communications data delivery system analysis for connected vehicles": Revision and update to modelling of promising network options, Rev 5, May 29, 2013.

ip.com Journal, Cooperative Vehicle-to-Vehicle Crash Avoidance Applications Using 5.9 Ghz Dedicated Short Range Communications (DSRC) Wireless Communications, The IP.com Prior Art Database, Sep. 14, 2011 Disclosure No. IPCOM000210877D, West Henrietta, NY, United States.

European Patent Office, extended European search report for application No. 19173942.4, dated Jul. 3, 2019.

European Patent Office, Office Action for application No. 19173942.4, dated Oct. 13, 2020.

IEEE Draft; 1609.2-2006, IEEE-SA, Piscataway, NJ USA, "IEEE Trial-Use Standard for Wireless Access in Vehicular Environments—Security Services for Applications and Management Messages Intelligent Transportation Systems Committee 1609.2-", vol. vt-its; 1609.2, Mar. 19, 2009, pp. 1-117, XP068032815.

European Patent Office, Office Action for application No. 19173942.4, dated May 12, 2021.

Intellectual Property India, Examination Report, Patent Application No. 201944018231, dated Sep. 9, 2022, pp. 1-6.

European Patent Application No. 23158896.3, Extended European Search Report, dated May 25, 2023.

Canadian Intellectual Property Office (CIPO) Official Action and Examination Search Report for Application No. 3,042,805 dated Oct. 25, 2023, 5 pages.

* cited by examiner

METHOD AND SYSTEM FOR REDUCED V2X RECEIVER PROCESSING LOAD USING CERTIFICATES

FIELD OF THE DISCLOSURE

The present disclosure relates to intelligent transportation systems (ITS) and, in particular, relates to communication between ITS stations.

BACKGROUND

Intelligent transport systems are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure such as on bridges or at intersections, and for other users of the transportation systems including pedestrians or bicyclists.

ITS system deployment is receiving significant focus in many markets around the world, with radiofrequency bands being allocated for the communications. In addition to vehicle to vehicle communications for safety critical and non-critical applications, further enhancements are being developed for vehicle to infrastructure and vehicle to portable communications.

An ITS station is any entity that may provide ITS communications, including vehicles, infrastructure components, mobile devices, among other options. In some cases, such ITS station may transmit erroneous data, either willfully or unintentionally. For example, an ITS station may have a faulty sensor which may provide faulty data in ITS messaging. In other cases, a malicious user may insert false information in messages that would cause the intelligent transportation system to work incorrectly. Typically, when such behavior is detected, an identifier of one or more certificates of the misbehaving ITS station may be indicated on a Certificate Revocation List (CRL), which may be used to manage misbehaving ITS stations. An ITS station that receives a message from another ITS station having a certificate indicated by the CRL can then either ignore such message or discount the significance of the information within such message.

However, the use of CRLs to manage misbehaving ITS endpoints has drawbacks. Specifically, the processing burden on ITS stations may be significant, especially in areas with a large number of ITS stations. For example, an ITS station on a busy street may receive one thousand messages each second, and currently a certificate associated with each message would need to be checked against a CRL. Further, to store a CRL for a large number of ITS stations within a geographic area could require significant resources.

BRIEF DESCRIPTION OF THE DRAWINGS

The present disclosure will be better understood with reference to the drawings, in which.

DETAILED DESCRIPTION OF THE DRAWINGS

Figure 1:
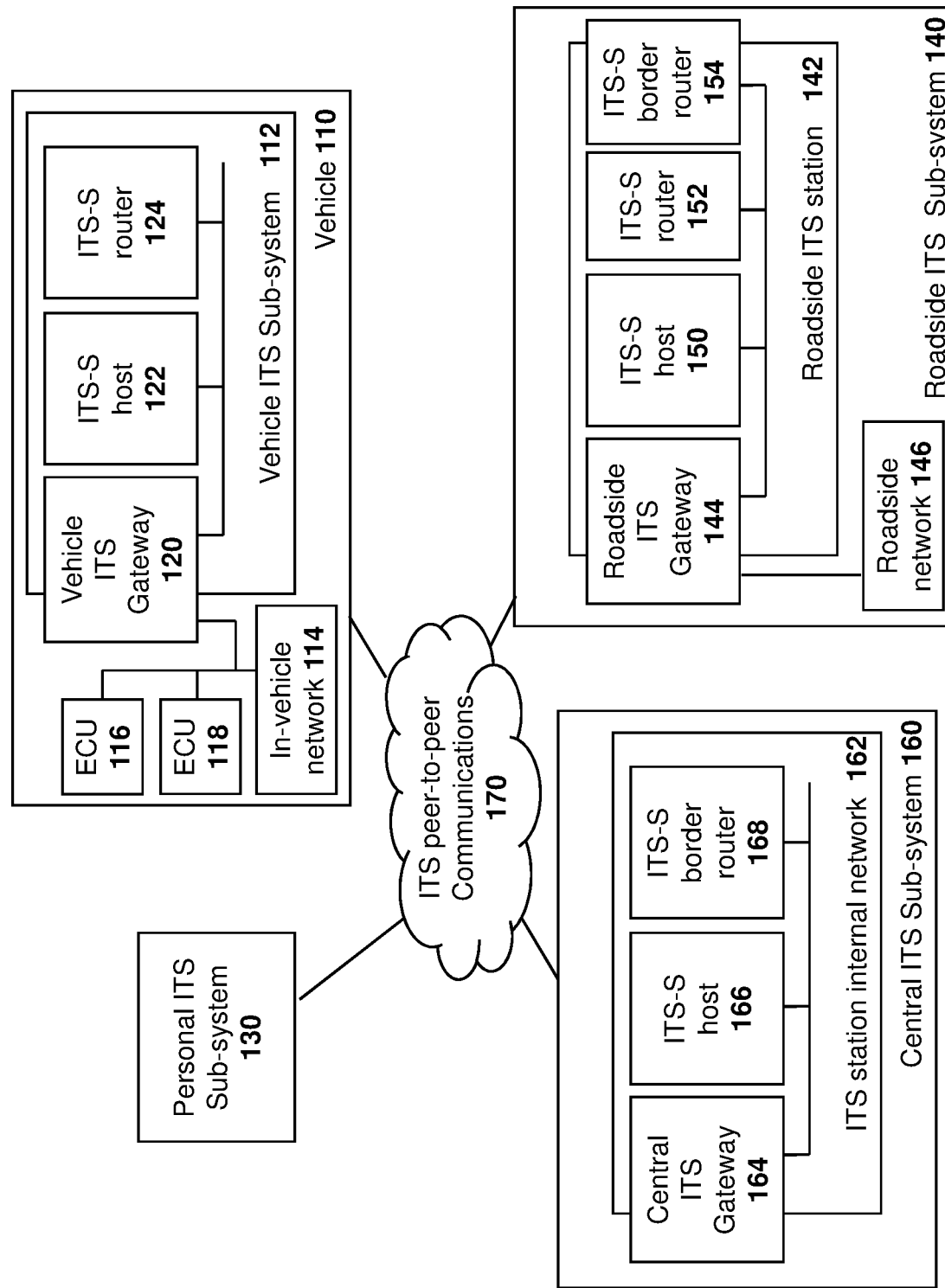
FIG. 1 is block diagram of an intelligent transportation system.

The present disclosure provides a method at a computing device within an Intelligent Transportation System, the method comprising: determining, at the computing device, whether a short-term certificate is available to sign a message; if the short-term certificate is available, signing the message with a private key associated with the short-term certificate; if the short-term certificate is not available, signing the message with a private key associated with a long-term certificate; and sending the message to a recipient.

The present disclosure further provides a computing device within an Intelligent Transportation System, the computing device comprising: a processor; and a communications subsystem, wherein the computing device is configured to: determine whether a short-term certificate is available to sign a message; if the short-term certificate is available, signing the message with a private key associated with the short-term certificate; if the short-term certificate is not available, signing the message with a private key associated with a long-term certificate; and sending the message to a recipient.

The present disclosure further provides a computer readable medium for storing instruction code, which, when executed by a processor of a computing device within an Intelligent Transportation System cause the computing device to: determine whether a short-term certificate is available to sign a message; if the short-term certificate is available, signing the message with a private key associated with the short-term certificate; if the short-term certificate is not available, signing the message with a private key associated with a long-term certificate; and sending the message to a recipient.

In the embodiments described below, the following terminology may have the following meaning, as provided in Table 1.

TABLE 1

Terminology

| Term | Brief Description |
| --- | --- |
| ITS Station | A communication device associated with the ITS system. In particular, an Intelligent Transport System endpoint which generates or receives V2X messages. An ITS station may for example be associated with a road user such as a car, truck, motorcycle, cyclist, pedestrian, animal, or with a road side unit. |
| Road user | Vehicle, truck, lorry, motorbike, cyclist, pedestrian, animal |
| Road Side Unit | A unit in, on, or around a road or other area that may be used by vehicles or other road users that may generate and/or read V2X messages. |
| V2X capable vehicle | A vehicular ITS Station |

Intelligent Transportation System software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from the pedestrian or portable (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others. As used herein, V2X thus includes any communication between an ITS station and another ITS station, where the station may be associated with a vehicle, road side unit, network element, pedestrian, cyclist, animal, among other options.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and allow a vehicle with such a device to take action to avoid a collision, such as braking or swerving. For example, an active safety system on a vehicle may take input from sensors such as cameras, radar, LIDAR, and V2X, and may act on them by steering or braking, overriding or augmenting the actions of the human driver or facilitating autonomous driving where a human is not involved at all. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs) mobile phones, user equipment, among other such devices.

A further component of the ITS system shown in the example of FIG. 1 includes a roadside ITS sub-system 140, which may contain roadside ITS stations which may be deployed on bridges, traffic lights, among other options.

The roadside sub-system 140 includes a roadside ITS station 142 which includes a roadside ITS gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS system in the example of FIG. 1 includes a central ITS sub-system 160 which includes a central ITS station internal network 162.

Central ITS station internal network 162 includes a central ITS gateway 164, a central ITS-S host 166 and a ITS-S border router 168. Gateway 164, central ITS-S host 166 and ITS border router 168 have similar functionality to the gateway 144, ITS host 150 and ITS-S border router 154 of the roadside ITS station 142.

Communications between the various components may occur through a ITS peer-to-peer communications network or via network infrastructure 170.

From FIG. 1 above, V2X communications may be used for both road safety and for improving efficiency of road transportation, including movement of vehicles, reduced fuel consumption, among other factors.

V2X messages are defined by the European Telecommunications Standards Institute (ETSI) fall into two categories, namely Cooperative Awareness Message (CAM) and Decentralized Environmental Notification Message (DENM). A CAM message is a periodic, time triggered message which may provide status information to neighboring ITS stations. The broadcast is typically over a single hop and the status information may include a station type, position, speed, heading, among other options. Optional fields in a CAM message may include information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include details about the causing event, detection time, event position, event speed, heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message is specified instead of the CAM/DENM messaging from ETSI.

Security in V2X

In V2X communications, there are various security challenges that need to be overcome. A first challenge concerns trust between the ITS stations. In particular, an ITS station may deliberately or unintentionally send out messages with incorrect content. Unintentional messaging may, for example, be based on sensor faults, among other options.

Receiving ITS stations would typically want to avoid acting on incorrect messages. Thus, a vehicle receiving an incorrect ITS message may, for example, unnecessarily apply its brakes, move over, among other options, thereby causing traffic problems. In some cases, this may be overcome by doing plausibility checks on information received in V2X messages and comparing such information with information received from other sensors such as video cameras, lidar, radar, among other options. However, this is not always possible.

A further security challenge in V2X deals with privacy. In particular, no single entity should be able to track a vehicle merely through V2X messaging. Thus, road users should be unable to track one another and, further, in some jurisdictions, operators of a Security Credential Management System (SCMS) or wireless network operators should also be unable to track road users.

A further security challenge for V2X is integrity and replay protection. In particular, messages should be unable to be tampered with, for example utilizing a "man in the middle" attack. Messages previously transmitted and replayed should be detected.

A further consideration for security in V2X is non-repudiation. For example, if an accident occurs, senders of messages should not be able to deny that they sent such messages. This is especially true if such messages may be directly or indirectly causal in the accident.

Based on the above, A Security Credential Management System has been, and continues to be, developed. The system involves a number of parties, including the Crash Avoidance Metrics Program (CAMP) industry consortium, the United States Department of Transportation, the United States National Highway Traffic Safety Administration, Institute for Electrical and Electronics Engineers (IEEE), and the Society for Automobile Engineers (SAE). Such groups have created a solution based on IEEE 1609, which is a series of standards for dedicated short range communications, as well as IEEE 802.11p with V2X application layer specifications provided by SAE. Security aspects are standardized in IEEE 1609.2. The solution sometimes goes by the name of DSRC/WAVE.

CAMP have further defined an SCMS that is influencing both proof of concept pilots and work in various standards. Such security work is outlined in general below.

In particular, in a first aspect of security, a V2X message has a particular format. Typically, the V2X message comprises three main parts. The first part is the application message content. The second part is the signature of the message provided by the sending ITS station. The third part of the V2X message is a certificate which is signed by a certificate authority.

CAMP uses elliptic curve Qu-Vanstone (ECQV) implicit certificates for V2X communication as specified in IEEE 1609.2, "IEEE Standard for Wireless Access in Vehicular Environments—Security Services for Applications and Management Messages", and are known to those skilled in the art.

During use, the sender would sign the V2X message contents using its private key and send the signed message along with its ECQV certificates to the recipient. The recipient then calculates the sender's verification public key from the ECQV certificate and the certificate authority's public key. The calculated public key can now be used to verify the signed message.

A vehicle or other ITS station could send a message signed with one of its private keys, referred to as a, and the corresponding implicit certificate, including for example (P, info) to the recipient ITS station. In the above, P is the public reconstruction key and info is the administrative information. The recipient extracts the sender's public verification key by calculating $eP+D$, where $e=hash(info,P)$ and D is a trusted copy of the certificate authority's public verification key, The receiver then uses the sender's public verification key to verify the signature on the message. This is for example illustrated in FIG. 2.

Figure 2:
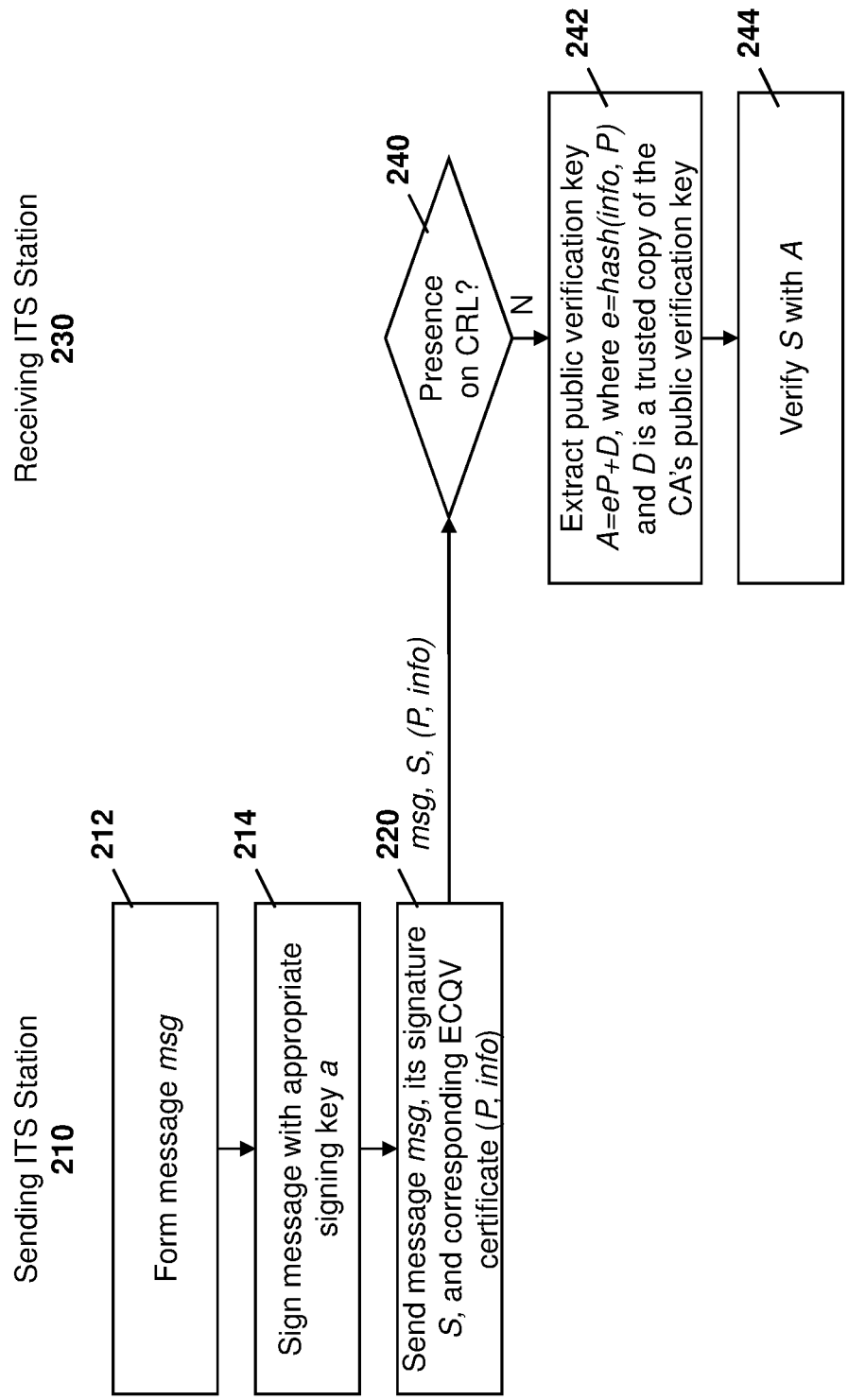
FIG. 2 is a data flow diagram showing a process for verifying messages between a sending ITS station and a receiving ITS station.

Referring to FIG. 2, a sending ITS station 210 first forms a message at block 212. The sending ITS station then signs the message with an appropriate key a, shown by block 214.

The sending ITS station 210 then sends the message, its signature s, and the corresponding ECQV certificate (P, info) as shown by block 220.

The receiving ITS station 230 may then check a certificate revocation list for the presence of the certificate, as shown at block 240. The certificate revocation list is described in more detail below. If the certificate is on the revocation list, the receiving ITS station may, for example, discard the message and end the process (not shown).

If the certificate is not on the revocation list, the receiving ITS station 230 may then extract the public verification key $A=eP+D$. This is shown at block 242.

The receiving ITS station 230 may then verify S with A, as shown at block 244.

One issue with the above is that a vehicle with a single static certificate could be tracked by infrastructure network elements or by other road users. To avoid this, an ITS station may be assigned a number of certificates for a certain time period, after which such certificates are discarded. For example, a vehicle or other ITS station may be assigned twenty certificates within a given week, after which the certificates are discarded.

An ITS station may cycle through the certificates, using each one only for a certain time period before another certificate is used instead. For example, each certificate may be used for five minutes, after which the next certificate is used. Each certificate further may include a different pseudonym as an identifier. Such use of rotating certificates may prevent the tracking of the vehicle by infrastructure elements.

Misbehavior Authority

A Misbehavior Authority (MA) determines whether messages from an ITS station are trustworthy. If the Misbehavior Authority determines that an ITS station can no longer be trusted then the ITS station certificates are revoked.

In this way, recipients of the V2X messages may be able to check whether the received certificate is still valid and has not been revoked. This is typically done by putting certificate identifiers of rogue certificates on a certificate revocation list.

However, such certificate revocation lists may become very large. Each vehicle is issued with approximately 20 certificates per week and may be issued with many years' worth of certificates. In this regard, each vehicle or ITS station that has its certificates revoked would add many certificates to such certificate revocation list.

Further, a geographic region for CRLs is generally large, leading to many ITS stations potentially being on the list.

In order to overcome this, CAMP has decided to use hash chains. A hash chain starts with a seed value and hashes it, and then hashes this hash, then hashes this hash and so on. The result is a sequence of values, called linkage seeds, each of which is the hash of the previous linkage seed. Linkage values may be generated from the linkage seeds.

When generating the ECQV certificates, the certificate authority places the kth linkage value (or a portion thereof) from at least one linkage-generating entity in the administrative portion of the certificate governing the kth time usage. To revoke an ITS station, the misbehavior authority places the current linkage seed in the CRL.

A recipient can quickly calculate the appropriate linkage value associated with a linkage seed on the CRL and compare it with the linkage value in the certificate. If the linkage values match, the certificate and its associated V2X message is rejected.

ITS stations can compute the linkage values associated with each linkage seed on the CRL on a weekly basis and save them in memory.

The above description is however simplified. CAMP requires two sets of hash chains for privacy reasons. Each generally utilizes the above behaviour.

In CAMP, linkage values are generated by two Link Authorities (LA1 and LA2). Each generates a random linkage seed per ITS station, $Is_1(0)$ and $Is_2(0)$, respectively. The linkage authorities then generate linkage seeds iteratively for subsequent times i, $Is_1(i)$ and $Is_2(i)$, respectively, where i corresponds to a number for a week.

Linkage values are generated from these linkage seeds and are placed within the ECQV certificates. Two different linkage values are provided for each of the certificates that a vehicle may use within the given week. For time value (id), LA1 calculates the value $plv_1(i,j)$ as a function of $ID_{LA1}$, $Is_1(i)$, and j using AES and XOR, where $ID_{LA1}$ is a value identifying LA1. In this case, j corresponds with a given certificate that is used within the week i.

More specifically, the first linkage seed is used as a key in an AES operation to produce a set of bits which is XOR'd with the equivalent set of bits provided using the $2^{nd}$ linkage value, and this is what is provided in the certificate by the transmitting ITS stations. Such operations are performed by the certificate authority.

For each misbehaving ITS station, the CRL contains two linkage seeds, one from each link authority, from which the receiving vehicle can generate all possible linkage value pairs that might potentially be used by that misbehaving vehicle at any given time during that week or subsequent weeks. The vehicle receiving the V2X message performs the same AES and XOR operations as described above on the linkage value pairs derived from the linkage seed information in the CRL.

By comparing this sequence with the sequence received in the certificate, the V2X message receiving ITS station can determine whether a message should be discarded because it is sent by an untrustworthy vehicle.

With this system, neither link authority can track a particular vehicle without colluding with the other link authority.

Figure 3:
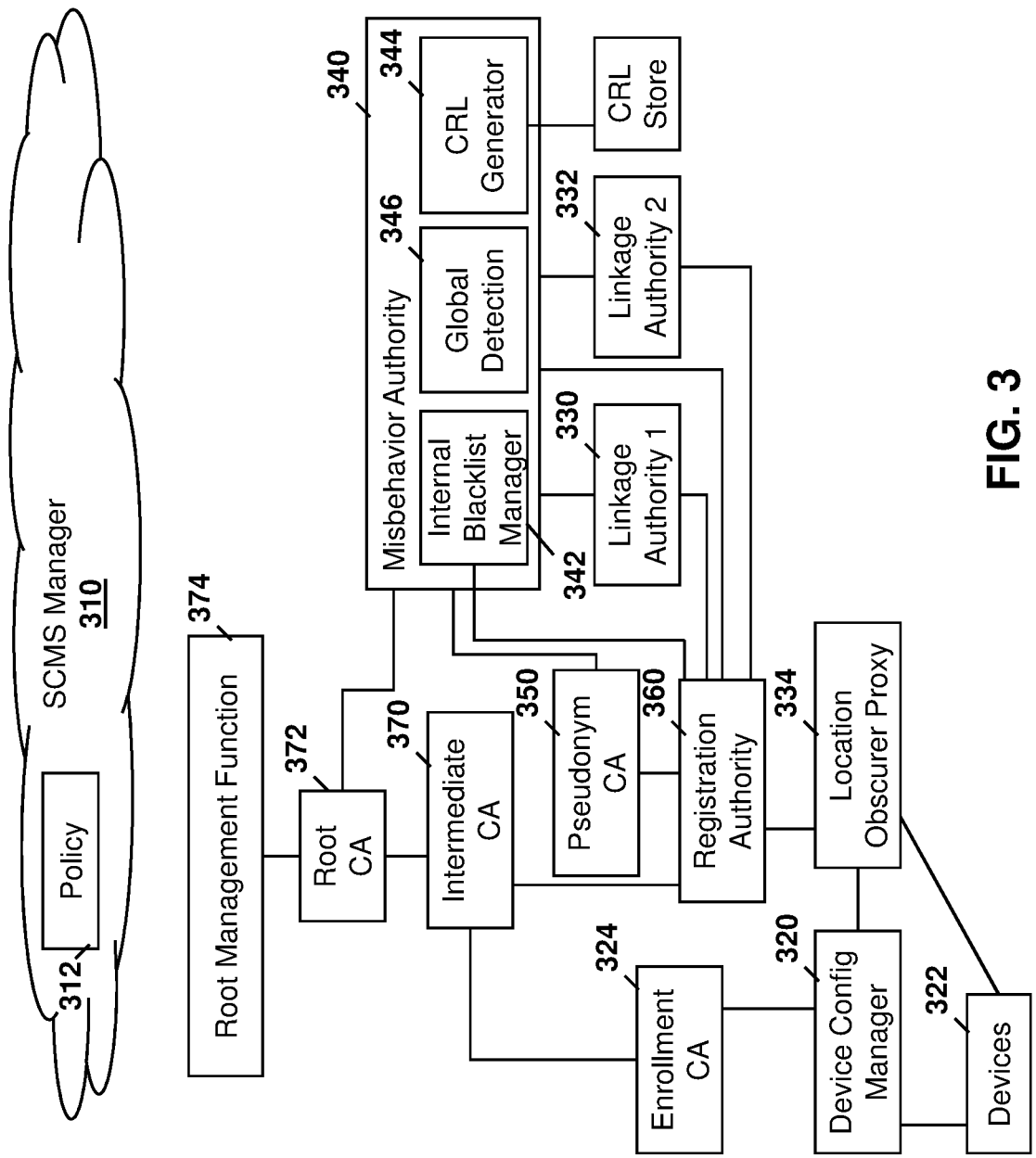
FIG. 3 is a block diagram showing logical roles in a security credential management system.

Based on the above principles, a CAMP system architecture is described with regard to FIG. 3.

In particular, the embodiment of FIG. 3 provides a structure in which at least two logical roles need to collude in order to obtain enough information to track a vehicle and hence to mitigate against unauthorized collusion these two logical roles can be carried out by different organizations.

In the embodiment of FIG. 3, the SCMS manager 310 sets the misbehavior revocation policy, shown at block 312.

The device configuration manager 320 provides SCMS configuration information to various devices 322. For example, the device configuration manager 320 may provide network addresses, changes in network element certificates, among other information.

The enrolment certificate authority 324 issues enrollment certificates to the device, which the device can then use for obtaining pseudonym certificates, among other information. Further, different enrolment certificate authorities may issue enrolment certificates for different geographic regions, manufacturers or device types.

A linkage authority, such as linkage authorities 330 and 332, generates linkage values that are used in the certificates and support certificate revocation. The use of two linkage authorities prevents an operator of a single linkage authority from linking certificates belonging to a particular device and thereby prevents a single linkage authority from tracking devices.

A location obscurer proxy 334 changes device source address and prevents the linking of network addresses to location.

A misbehavior authority 340 determines which devices are misbehaving according to reports that it receives, and enters such devices on a blacklist managed by internal blacklist manager 342 and on the CRL, managed by CRL generator 344. The detection of misbehavior is done through a global detection module 346.

A pseudonym certificate authority 350 issues pseudonym certificates to devices, each certificate only being usable over a limited and specified time. Pseudonym certificate authorities may be limited to use for a particular geographic region, used by a particular manufacturer or used by a particular device type.

The registration authority 360 validates, processes and forwards requests for pseudonym certificates to the pseudonym certificate authority 350.

An intermediate certificate authority 370 is part of a chain of trust back to the Root CA 372 that enables the intermediate CA to issue certificates on behalf of the Root CA 372.

A Root certificate authority 372 is a trusted entity which issues certificates that can be used to verify information or identity provided by the sender of the certificate. The Root CA may be managed by a root management function 374.

Certificates are, for example, defined in the IEEE 1609.2-2016 standard for Wireless Access in Vehicular Environments—Security Services for Applications and Management Messages. An example of a certificate format is that described by IEEE 1609-2.

In IEEE 1609.2, two forms of revocation information are possible. The type of revocation information that applies to certificate is indicated by a certificateID field in a certificate.

A first form of revocation information is linkage based. If the certificateID field indicates the choice linkageData, the certificate is revoked by publishing the linkage seed value corresponding to the linkageData value. This is for example provided in IEEE 1609.2.

A second form of revocation information may be hash ID-based. In this case, if the certificateID field indicates the choice name, binaryID or none, the certificate may be revoked by publishing a hash of the certificate. This is for example described in IEEE 1609.2 specification.

Further, in some cases, the certificate itself may provide an indication that it will not appear on a CRL. Specifically, in section 5.1.3.3 of the IEEE 1609.2 specification, one way in which a receiver of the certificate can be informed whether or not the certificate will be revoked and specifically whether or not it will ever appear on a certificate revocation list is provided. In particular, this section states:

a cracald of all 0s and a CRLSeries value of 0 indicates is that the certificate will not be revoked, i.e., that there is no revocation list that it will appear on. This may be because it has a very short lifetime or for some other reason.

Thus, from the above, the cracald is one of the fields that is included in a certificate.

A CRL may have various contents as for example described in IEEE 1609.2.

Online Certificate Status Protocol (OCSP) and OCSP Stapling

OCSP is a client-server protocol that is used by a client for obtaining the revocation status of the digital certificate from a server. For example, OCSP is defined in the Internet Engineering Task Force (IETF) Request For Consultation (RFC) 6960, *"X.509 Internet Public Key Infrastructure Online Certificate Status Protocol—OCSP"*, June 2013.

The certificate being your revoked may, for example, be an X.509 digital certificate in some cases.

Upon receiving the digital certificate, for example as part of a signed message, an OCSP client queries and OCSP server to determine if the certificate is valid and has not been revoked.

According to IETF RFC 6066, *"Transport Layer Security (TLS) Extensions: Extension Definitions"*, January 2011, the OCSP server may then provide an OCSP response indicating one of the following states of the received certificate: Good, Revoked, Unknown.

The OCSP server may also include other information, including a "thisUpdate" field and a "nextUpdate" field, similar to fields contained in CRLs. This other information together provides a start and end time/date of the validity of the OCSP response. In other words, the fields define a period of validity of the OCSP response.

The OCSP server may alternatively provide an error, for example based on a malformed OCSP request.

OCSP stapling is also known as "TLS certificate status request extension". This may, for example, be defined in IETF RFC 6066 and also IETF RFC 6961, *"The Transport Layer Security (TLS) Multiple Certificate Status Request Extension"*, June 2013.

OCSP stapling modifies OCSP in that instead of an entity that receives a certificate having to contact the OCSP server, the entity that intends to send a certificate first contacts an OCSP server using the above-described mechanism, receives a time-stamped OCSP response, and then appends or "staples" the time stamped OCSP response to the certificate that it sends out. The appended/stapled time stamped OCSP response proves to all receiving entities that the received certificate is valid for a specific period of validity. In other words, the certificate has not been revoked.

Stapling therefore negates the requirement for clients receiving digital certificate or data signed by a digital certificate to contact the certificate authority that issued the certificate using OCSP themselves, or indeed to check the received certificate against a CRL.

IETF RFC 6066 describes more details of messaging that is used as part of the TLS mechanism in a typical case of a web client accessing a server. During the TLS handshake, the web client may request the server to provide an OCSP response, which the server staples to the certificate that the server provides to the client. The client makes this request by including a CertificateStatusRequest in the TLS handshake.

The contents of an OCSP response are defined in IETF RFC 6960.

The contents of a regular OCSP request are also defined in IETF RFC 6960.

Based on the above, the use of CRLs to manage misbehaving vehicles or V2X endpoints has drawbacks based on various factors.

A first factor may be the length of the CRLs, which can be very large. In particular, a CRL may pertain to a very large geographic area and there may be many vehicles in such geographic area. Further, there may be multiple CRLs per ITS station or service type and this may lead to a number of large CRLs that may be required to be searched prior to identifying misbehaving vehicles.

The use of large CRLs can be onerous for both processing and in terms of memory for ITS stations that are the recipients of V2X messages. Each ITS station has to compare an identifier of the certificate of each received message with the identity of all certificates indicated by the CRL. The comparing would determine whether the message could be trusted.

For example, in an urban environment, an ITS station could receive around 1000 signed messages each second, based on 100 vehicles or ITS stations in proximity to each other, where each ITS station is sending 10 messages per second. This may, for example, be Basic Safety Messaging.

Additionally, there may be potentially wasted cellular resources in provisioning large CRLs or sets of CRLs to ITS stations.

Based on this, in accordance with the embodiments of the present disclosure, a certificate may be provided for a V2X message which contains an indication to a receiving ITS station that a check of the CRL does not need to be performed. The indication may, for example, be the use of a short-lived certificate, which provides the indication that the certificate is still valid since the validity period is short-lived. The indication may further be an OCSP staple attached to a certificate, indicating that a check of the certificate against the CRL was performed recently and that the certificate is still valid.

In any of the above embodiments, the processing at the receiving ITS station can be reduced by not requiring the CRL check for such V2X messages. Further, the storage requirements on the receiving ITS station can be reduced, since the CRL may not be as long.

Each scenario is described below.

Combined Use of Short-Lived Certificates and Long-Lived Certificates

A vehicle or other ITS station may send V2X communications signed by a certificate. In accordance with one embodiment of the present disclosure, a vehicle may sign the V2X message with either short-lived or long-lived certificates, depending on a variety of factors.

Figure 4:
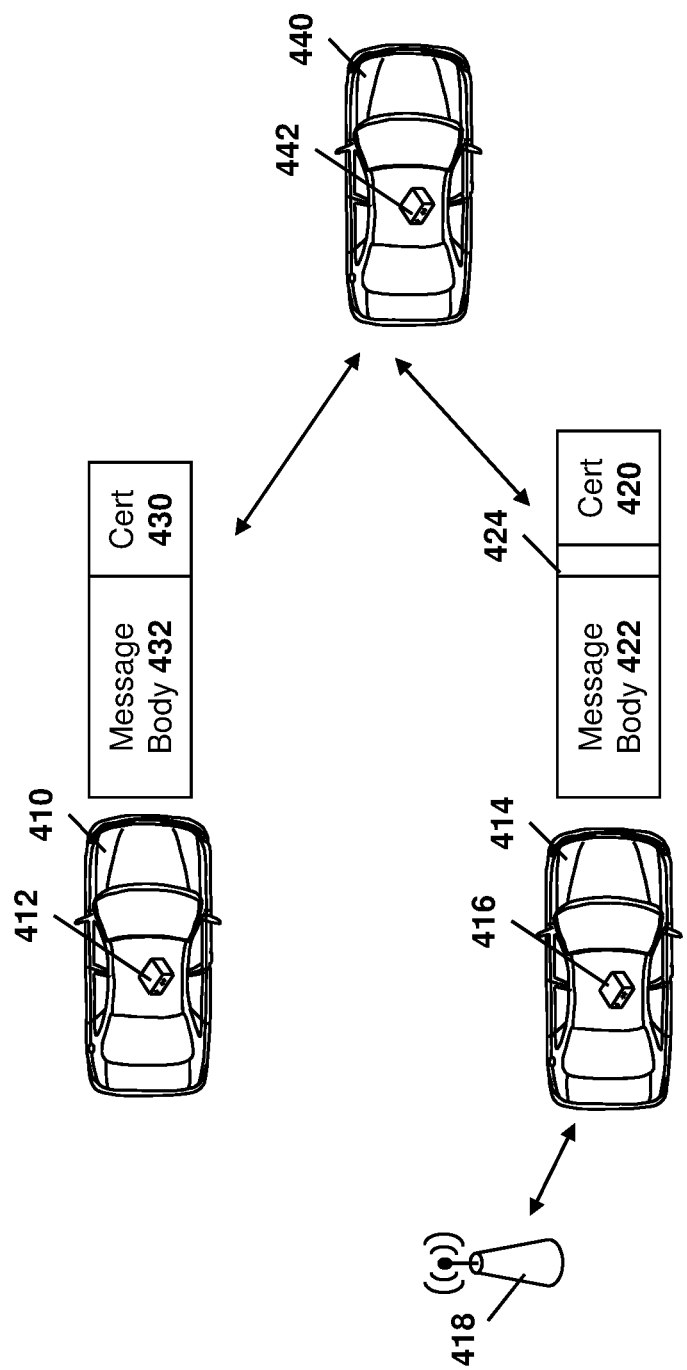
FIG. 4 is a block diagram showing a first vehicle sending long-lived certificates and a second vehicle sending short-lived certificates to a receiving ITS station.

Reference is now made to FIG. 4. In accordance with the embodiment of FIG. 4, a vehicle 410, and specifically a computing device 412 on vehicle 410, may not have regular WAN connectivity (for example using cellular or WLAN).

A vehicle 414, and specifically a computing device 416 on vehicle 414, may have regular WAN connectivity (for example using cellular or WLAN), for example from a base station or access point 418.

Each of computing devices 412 and 414 may determine whether to send a short-lived certificate or a long-lived certificate based on various factors. The computing device on each vehicle may decide whether it has the capability to obtain short-lived certificates 420. If it does not have the capability to obtain such certificate, the vehicle will always send long-lived certificates 430.

If a computing device 416 for vehicle 414 does have the capability to obtain short-lived certificates, then computing device 416 will use one of its short-lived certificates 420 when sending a message body 422 if such certificate is available and the certificates have not yet expired in time. If there are no short-lived certificates and the short-lived certificates that exist are already expired, the computing device 416 will use one of its long-lived certificates when sending message body 432.

Optionally, new information in a certificate that is sent in a V2X message, as shown by area 424, may be used by receiving vehicle 440, and specifically a computing device 442 associated with vehicle 440, to determine whether the receiving vehicle 440 can avoid doing a check against the CRL.

While the embodiment of FIG. 4 only shows area 424 in the short lived certificate 420, in some cases new information may also be shown with regards to a long lived certificate 430.

In the case of a V2X message received by vehicle 440 from vehicle 414, since new information associated with the certificate is present and indicates that the certificate is a short-lived certificate, it is necessary for the computing device 442 associated with the receiving vehicle 440 to check that the certificates are valid, but no check against the CRL is needed.

In the case of a V2X message from vehicle 410 to vehicle 440 that uses a long-lived certificate, since there is no indication in the certificate that the certificate is short-lived, a check against a CRL is needed.

Various reasons exist for the inability to obtain short-lived certificates. In one embodiment, a vehicle may not be cellular enabled, and therefore may not be regularly connected to a server which may provide short-lived certificates. In this case, the vehicle may rely on the long-lived certificates that may be downloaded at longer intervals, for example when the vehicle is serviced, among other options.

However, as the number of vehicles that are connected via cellular increases in the future, then number of vehicles that can frequently get fresh certificates will increase. In this way, processing and memory requirements on vehicles which receive V2X messages will decrease.

Utilizing the above, several possible ITS station deployment scenarios exist. For example, these are provided in Table 2 below.

TABLE 2

| ITS station deployment scenario number | Single mode ITS station type: long-lived certs only | Single mode ITS station type: short-lived certs only | Dual mode ITS station type: short-lived and long-lived certs | Notes |
|---|---|---|---|---|
| Indicating ITS station deployment scenarios in a particular geographical region | | | | |
| 1 | x | x | Y | |
|   | x | Y | x | legacy method |
| 2 | x | Y | Y | |
|   | Y | x | x | legacy method |
| 3 | Y | x | Y | |
| 4 | Y | Y | x | |
| 5 | Y | Y | Y | |

In accordance with Table 2 above, various deployment situations exist. In a first ITS deployment scenario, labeled as scenario 1 in Table 2, a homogenous use of the dual-mode ITS station types may be provided. In this deployment scenario, one ITS station type is envisioned, specifically a dual-mode ITS station that can handle both "long-lived" certificates" and "short-live" certificates.

A new batch of short-lived certificates would be obtained frequently. For example, the short-lived certificates may be obtained daily.

In case of temporary network connection unavailability, the ITS station may be unable to obtain a new short-lived certificate. In this case, the ITS station can fall back on using long-lived certificates to sign messages.

From Table 2 above, a further deployment scenario, labeled as scenario 3 in the table, comprises a heterogeneous mix of single mode (long lived certificate based) ITS station types and dual-mode ITS station types.

The two ITS station types are envisioned and communication between the two ITS station types are possible.

In particular, the single mode ITS station type is designed to work in a system where a batch of long-lived certificates have been provided to the vehicle. A batch of long-lived certificates refers to a scenario, for example, where three years worth of certificates have been provided to the vehicle. The certificates could, for example, be uploaded to the vehicle at a factory or when the vehicle is serviced for example at a garage. An example of a V2X solution would be one conforming to the current CAMP specification and thus the single mode ITS station might form part of the first generation of ITS stations.

Further the single mode ITS station is capable of both generating a V2X message that uses one of the long-lived certificates and receiving a V2X message that includes long-lived certificates.

In this scenario, a dual-mode ITS station type is one that can handle both long-lived and short-lived certificates. This ITS station may form part of the second generation of ITS station who would obtain a new batch of short-lived certificates that would be obtained frequently.

While the two scenarios are described above, in other cases, as seen from Table 9, other deployment scenarios utilizing a combination of single mode ITS stations and/or a dual mode ITS station type could equally be used.

In the scenarios above, dual-mode ITS stations should attempt to get a new set of certificates every "short-lived" period. For example, this may occur every day. Such short-lived certificates could for example be obtained via cellular connectivity in some embodiments. However, in other embodiments other ways of obtaining the certificates may be possible, including WLAN connections. For example, a vehicle parked overnight in a garage may have regular access to WiFi. Other options are possible.

Short-lived certificates are provided from a certificate authority with one or more distinguishing features that enable an endpoint that receives the certificate to determine whether the certificate is short-lived or long-lived. Details of various distinguishing features are provided in the embodiments below.

Figure 5:
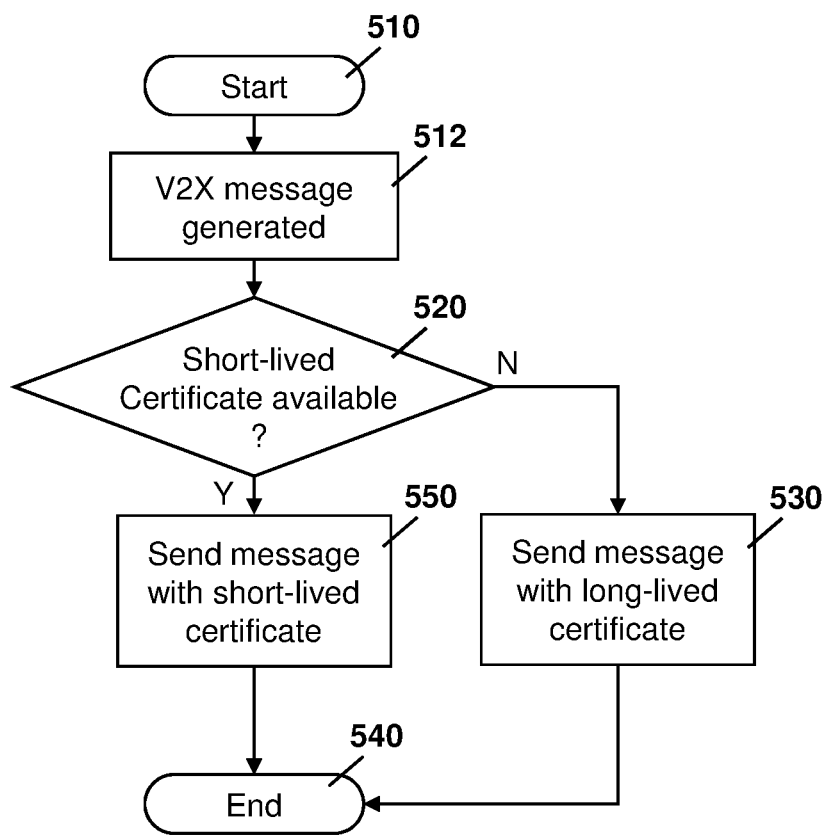
FIG. 5 is a process diagram for a process at a sending ITS station for determining whether to send a message signed with a short-lived certificate or a long-lived certificate.

The decision to send a short-lived or long-lived certificate, may for example, utilize the process of FIG. 5.

Referring to FIG. 5, the process starts at block 510 and proceeds to block 512 in which a V2X message is generated. Such V2X message may include periodic reports or event reports, among other options.

The process then proceeds to block 520 in which a check is made to determine whether any non-expired short-lived certificates are available. In particular, if the dual-mode ITS station has access to fresh, short-lived certificates that have not yet expired, then it can use such certificates to send V2X messages. A non-expired certificate would be one in which the current time is within the validity period of the certificate.

From block 520, if there are no non-expired short-lived certificates then the process proceeds to block 530 in which the message generated at block 512 is sent to the recipient utilizing a long-lived certificate. From block 530 the process proceeds to block 540 and ends.

Conversely, from block 520, if there are non-expired short-lived certificates, the process proceeds to block 550 in which the ITS station may send the message generated at block 512 with the short-lived certificate. From block 550 the process proceeds to block 540 and ends.

Figure 6:
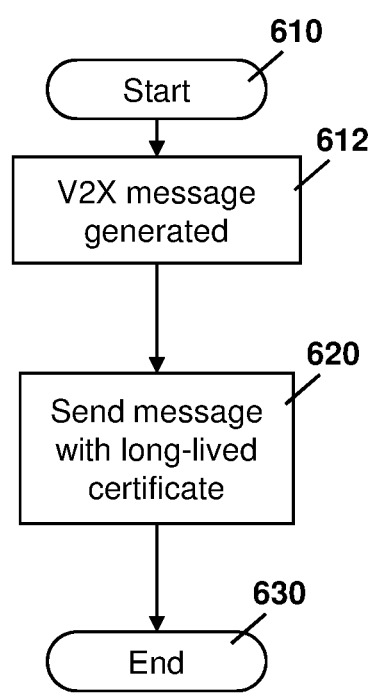
FIG. 6 is a process diagram showing a process at a single mode ITS station for sending a V2X message.

Conversely, a single mode ITS station uses traditional legacy procedures. Referring to FIG. 6, the process at a legacy or single mode ITS station starts at block 610 and proceeds to block 612 in which a V2X message is generated.

The process would then proceed to block 620 in which the message is sent with the long-lived certificate of the ITS station.

The process then proceeds to block 630 and ends.

A receiving ITS station, if capable of the dual-mode perception, may then be able to determine whether the certificate is short-lived or long-lived. In particular, reference is now made to FIG. 7, which shows the process at a receiving ITS station. In particular, the process of FIG. 7 starts at block 710 and proceeds to block 712 in which the ITS station receives the V2X message.

The process then proceeds to block 720 in which the certificate is inspected and a check is made to determine whether the certificate is a short-lived certificate. Details of the checking at block 720 are provided below.

If the certificate is not a short-lived certificate, the process proceeds to block 730 in which the certificate is designated to be a long-lived certificate.

From block 730 the process proceeds to block 732 in which a check is made to determine whether the certificate is identified on the CRL. Specifically, the ITS station will periodically receive and store a CRL, and the check at block 732 may be made against the CRL to determine whether the certificate is on it. Such checking may be done in accordance with the embodiments described above.

If the certificate is identified on the CRL then the process proceeds from block 732 to block 740 in which the V2X message is discarded. From block 740 the process proceeds to block 742 and ends.

Conversely, if the certificate is long-lived certificate but not on the CRL, the process proceeds from block 732 to block 750 in which a check is made to determine whether the certificate is valid and the message is correctly signed. If not, the process may proceed to block 740 to discard the message and the process may then proceed to block 742 and end.

From block 750, if the certificate is verified and the message is correctly signed, then the V2X message may be passed to the application layer, shown at block 760. From block 760 the process proceeds to block 742 and ends.

From block 720, if the certificate is identified as short-lived then the process proceeds to block 770 in which a check is made to determine whether the certificate is valid and the message is correctly signed. If no, then the process proceeds to block 740 in which the message is discarded and to block 742 in which the process ends.

Conversely, if the certificate is verified and the message is correctly signed, as determined at block 770, the process may proceed to block 772 in which the message is passed to the application layer. From block 772 the process proceeds to block 742 and ends.

Figure 8:
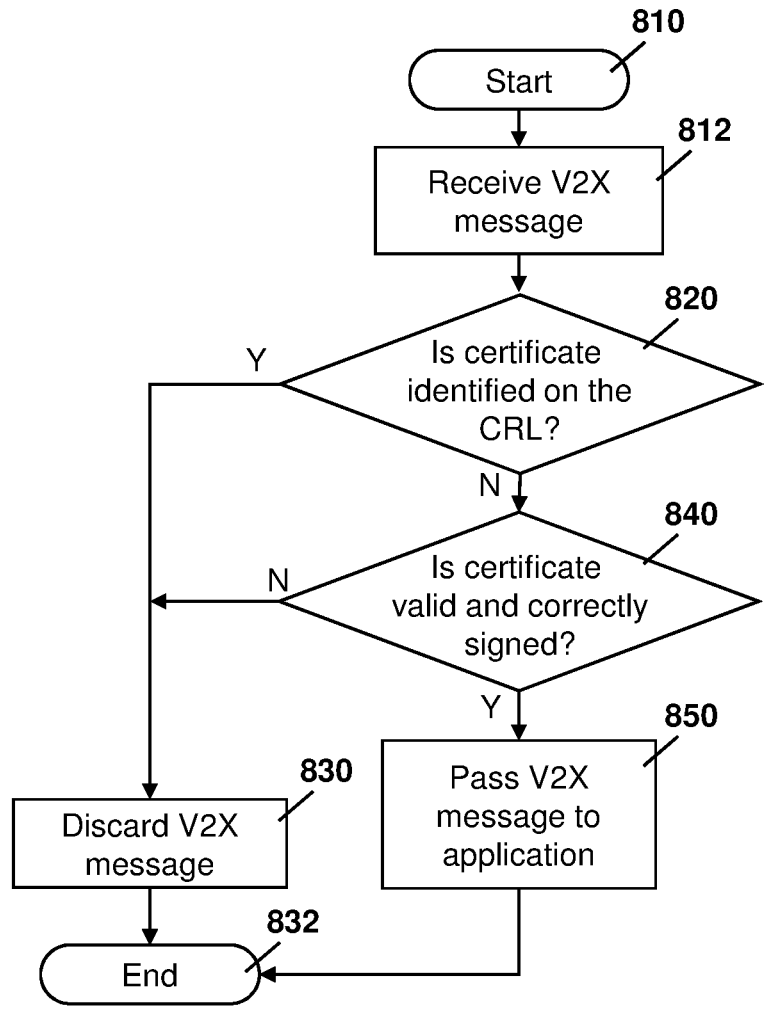
FIG. 8 is a process diagram showing a process at a receiving single mode ITS station for processing and incoming the V2X message, regardless of whether a short or long-lived certificate was used.

Referring to FIG. 8, a single mode ITS station receiving a message would perform the same processing on the received message, regardless of whether the certificate was a long-lived or a short-lived certificate. In particular, the process of FIG. 8 starts at block 810 and proceeds to block 812 in which the single mode ITS station receives the V2X message.

From block 812 the process then proceeds to block 820 in which a check is made to determine if the certificate is on the CRL. As will be appreciated, a short-lived certificate would not be on a CRL, but a single mode ITS station would still do the check since this would be the logic for a traditional ITS station.

From block 820, if the certificate is identified to be on the CRL, the process proceeds to block 830 in which the message is discarded. The process then proceeds to block 832 and ends.

Conversely, if the message is not on the CRL, the process proceeds to block 840 in which a check is made to determine whether the certificate is valid and if the message is signed correctly. If not, the process proceeds from block 840 to block 830 in which the message is discarded. The process then proceeds to block 832 and ends.

From block 840, if the certificate is verified and the message is correctly signed, then the process proceeds to block 850 in which the V2X message is passed to higher layers.

Figure 7:
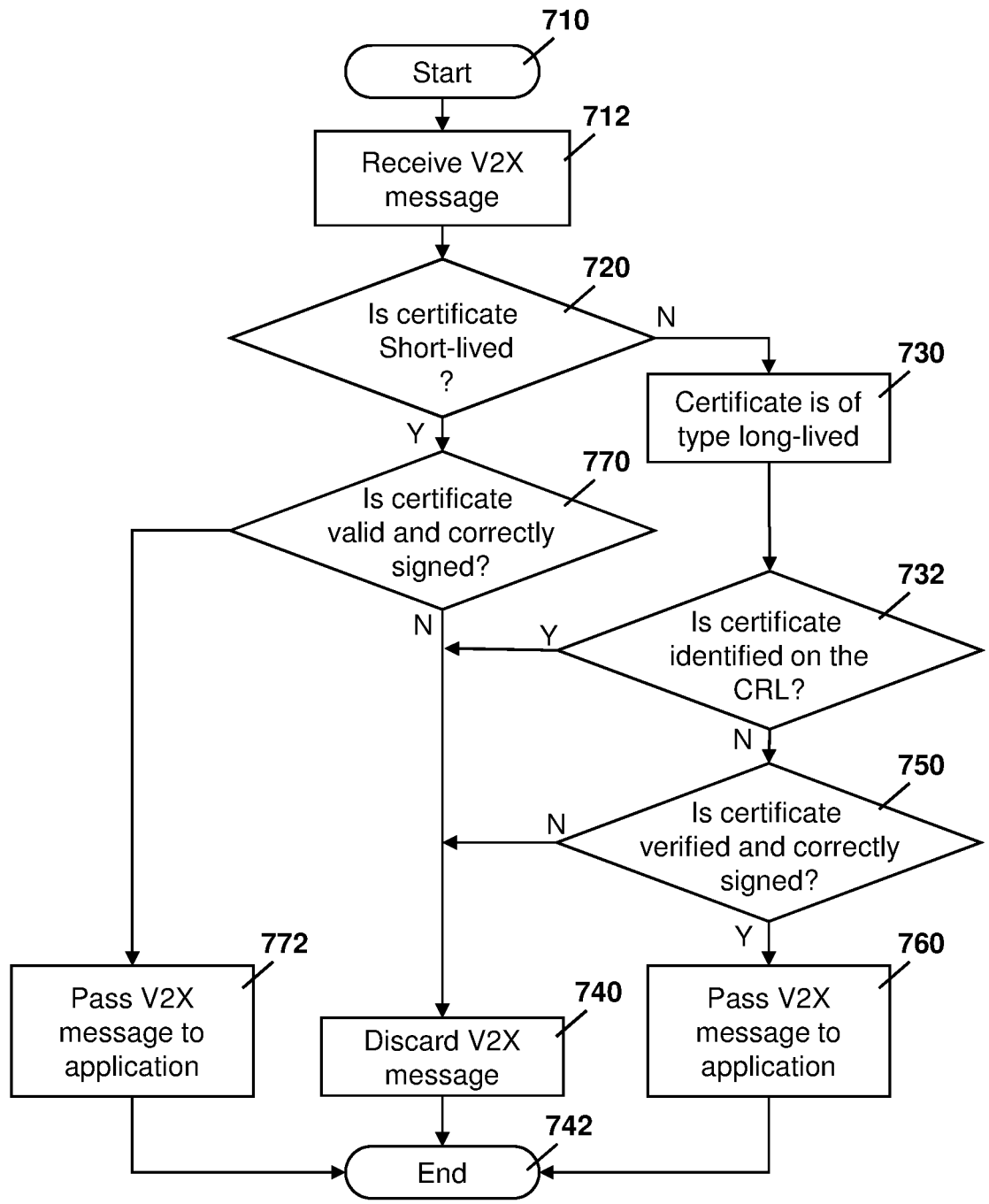
FIG. 7 is a process diagram showing a process at a receiving ITS station for determining whether to perform a CRL check on an incoming V2X message.

The embodiments of FIGS. 7 and 8 provide only one option for the receiving V2X station. In other cases, the ordering of the checks could be different. Further, other combinations of checks may also be possible. A key in the embodiment of FIG. 7 is that for a short-lived certificate, a check against the CRL is avoided, saving processing time at the receiving ITS station.

The determination of the certificate type at block 712 may be done in a number of ways. Examples are provided below.

Determination Of Certificate Type Through Use of Cracaid

In one embodiment, if the certificate authority is issuing a short-lived certificate, which for example may only have a 24-hour expiry time, then it may set the cracaid to all zeros. By setting the cracaid to all zeros, this may provide an indication to a receiving ITS station that the certificate is a short-lived certificate.

On the other hand, if the certificate authority is issuing a long-lived certificate, then it will set the cracaid to a nonzero value in accordance with the IEEE 1609.2-2016, Section 5.1.3.3.

Therefore, the check at block 712 would check the cracaid and thereby determine whether or not a check against the CRL is required. The cracaid is trustworthy because it is signed by the root, and not something that may be changed by an intermediary.

Determination of Certificate Type Through Linkage Value

In a further embodiment, a specific linkage value or specific linkage values may be used in a certificate to indicate that the certificate is a short-lived certificate. This may be standardized, for example, in IEEE 1609.2 in some cases.

For example, a nine byte sequence of all zeros as a linkage value may indicate a short-lived certificate. In accordance with the present disclosure, this specific linkage value (or values) may be called the short-cert-indicative-linkage-value.

A dual mode ITS station, on reception of the V2X message, would perform various actions, including checking whether the certificate is authentic. In other words, the check would indicate whether the certificate authority provided a signature that is consistent with the certificate contents.

The check at block 712 may check whether the linkage value in the received certificate is equal to the short-cert-indicative-linkage-value. If it is, and if the message is within the validity period, indicating that the certificate is not expired, and provided that other checks on the V2X message are passed, the check of the CRL is not necessary. From FIG. 7, if the validity period has expired for a short-lived certificate then the message is discarded.

Conversely, the use of linkage values may find that the linkage value in the received certificate does not equal the short-cert-indicative-linkage-value. In this case, the message will be processed as a long-lived certificate in a conventional way, where a CRL check would be needed.

For the legacy mode ITS station, on reception of the V2X message, the message would be processed in a manner utilizing legacy CAMP, for example using the process of FIG. 8. Consequently, if the received certificate happens to be a short-lived certificate and linkage value happens to be set to the short-cert-indicative-linkage-value, then a single mode or legacy ITS station will check that the linkage value is not indicated by the CRL. In this case, the short-cert-indicative-linkage-value should never appear on the CRL to ensure such certificate is not deemed invalid.

Based on the above, a legacy ITS station will still check the CRL and find nothing, and hence the certificate will pass the CRL test.

A long-lived certificate would be processed by a legacy ITS station in the same way that current long-lived certificates are processed using a CAMP procedure.

The use of a linkage value may allow for legacy ITS stations to handle messages with both short and long-term certificates.

Determination of Certificate Type Through HashID

In a further embodiment, instead of using the linkage value, the IEEE 1609.2 standard specifies that HashIDs may be used for revoking certificates. In this case, when a certain HashID value is used in the certificate, this may indicate that the certificate is a short-lived certificate and hence no check against the CRL would be needed. Thus a similar process to that described above with regard to the linkage values could be utilized with Hash IDs.

For example, in one case, a certificate may have a 10 byte sequence of all zeros as the HashID, which would indicate that this certificate is short-lived. Other values may conversely indicate that the certificate is long-lived. The use of a 10 byte sequence of values is however merely provided as an example, and other examples of a value for a HashID could be used with the embodiments of the present disclosure to indicate a short-lived certificate.

Determination of Certificate Type Through Validity Period

In a further embodiment, a receiving ITS station may be programmed to treat any non-expired certificate which has a duration X and a start time that is within X hours of the current time to be short-lived, while other non-expired certificates are treated as long-lived. For example, the duration X could be 24 hours assuming that a device has to fetch new short-lived certificates every 24 hours.

In this regard, the check at block 712 may find the duration of the certificate and determine based on such duration whether the certificate is a short-lived or a long-lived certificate and therefore whether the CRL check needs to be done or not.

Determination of Certificate Types Through Different Certificate Authorities

In a further embodiment, short-lived certificates may be provided by different certificate issuers than long-lived certificates. An issuer is, for example, defined in IEEE 1609.2.

Different issuers could be associated with different root certificate authority certificates. These different root certificate authority certificates could be associated with the same or different certificate authority organizations.

Further, different issuers within a certificate chain that is descended from the root certificate and the same certificate authority may be used.

The case in which all certificates are managed by the same organization or certificate authority domain may allow better privacy management because the SCMS entities relevant to the management of both short-lived and long-lived certificates may be managed within the control of the same certificate authority. Such SCMS entities include, for example, the misbehavior function and CRL issuing network elements and the entities responsible for blacklisting and white listing vehicles.

In one embodiment, two behaviors may be defined for a receiving ITS station. In one case, devices that receive V2X message would be preconfigured with an association between an issuer identity and certificate type, whether short-lived or long-lived. When the ITS receiving station determines that the certificate is a short-lived type, then it does not perform a check against the CRL. However, when the receiving ITS station identifies the certificate as a long-lived type, then the CRL check is performed.

In another embodiment, the V2X receiving ITS station would always perform a check against the CRL. However, in this case, the certificate authority that is associated with the short-lived certificate would provide a CRL with a length of zero. This would enable the benefit of reduced processing burden at the receiving ITS station to be achieved by a single mode ITS station design that always assumes there is a CRL present. This embodiment may therefore be beneficial if legacy ITS stations are deployed which are not explicitly designed to identify short-lived certificates and process them in a different way.

SCMS Actions for Dual-Mode Terminals

At the network, identification by the misbehavior authority that a vehicle is misbehaving, irrespective of whether the vehicle is misbehaving using its short-lived certificates or long-lived certificates, would generally result in an identifier of the long-lived certificates to be placed on the CRL.

Further, the vehicle may also be blacklisted with regard to the issuance of new long-lived certificates and the vehicle may further be blacklisted with regard to the issuance of new short-lived certificates (or OCSP staples as described below).

Similarly, when a vehicle finds it has been detected as being misbehaving, either because its long-lived certificates have been placed on the CRL or it has been refused allocation of new short-lived certificates, then a vehicle may take appropriate action with regard to the usage of other types of certificates. For example, a vehicle could completely stop generating V2X messages and not use any of its certificates if it has been blacklisted, even if one class of certificate is potentially still usable. This may identify the case, for example, that the vehicle has a faulty sensor but is acting as a good citizen within the ITS system.

OCSP Staples

As an alternative embodiment to long and short-lived certificates, in a further embodiment the scenario may exist where devices only obtain three years worth of long-lived certificates, but in which regular access to the SCMS may be made in order to obtain OCSP responses which can then be stapled to the certificates in V2X messages.

A device that receives V2X messages with the OCSP response stapled to it does not need to check the CRL, and instead only needs to check that the stapled OCSP response is correctly signed and has not expired. In this way, the processing burden of the CRL is avoided.

In particular, rather than having to obtain a large number of short-lived certificates, the present embodiment may only obtain three years' worth of long-lived certificates. Further, the device sending the V2X messages may also regularly access the SCMS in order to obtain OCSP responses. These responses can be stapled to the certificates in the V2X message, providing an indication to the receiving ITS station that a CRL check is not needed.

Figure 9:
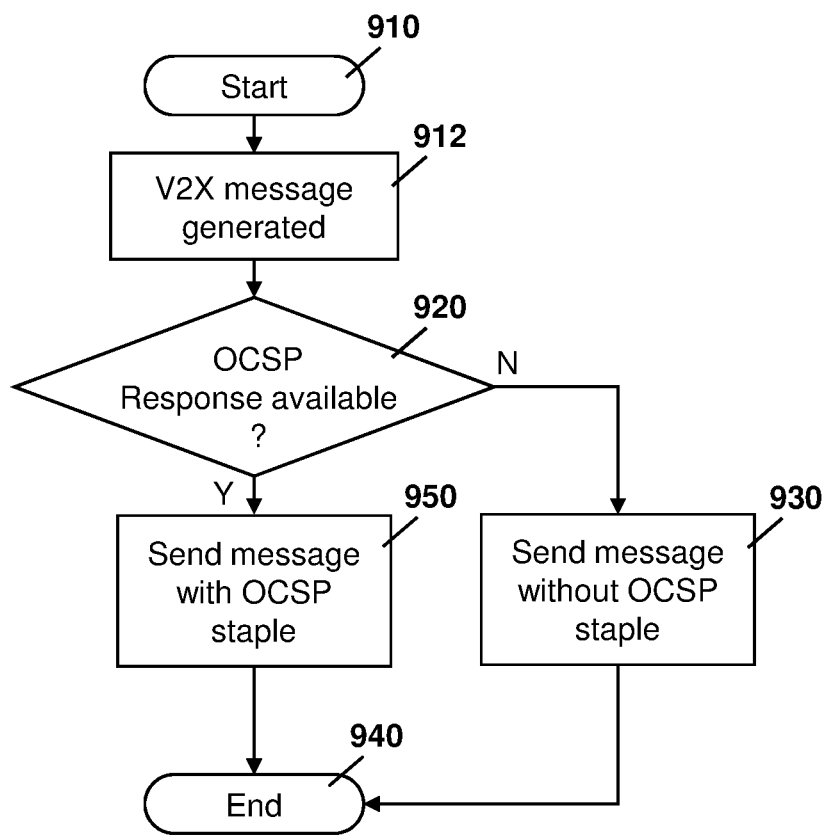
FIG. 9 is a process diagram showing a process at a sending ITS station for determining whether to send a message with an OCSP staple or not.

In particular, reference in now made to FIG. 9, which show a process at an ITS station sending a V2X message. The process of FIG. 9 starts at block 910 and proceeds to block 912 in which a V2X message is generated. Such V2X message may include periodic reports or event reports, among other options.

The process then proceeds to block 920 in which a check is made to determine whether a non-expired OCSP response is available for the certificate of the ITS station. One embodiment for obtaining OCSP responses is described below. A non-expired OCSP response would be one in which the expiry time is still in the future.

From block 920, if there is no non-expired OCSP response then the process proceeds to block 930 in which the message generated at block 912 is sent to the recipient utilizing a long-lived certificate, without an OCSP staple. From block 930 the process proceeds to block 940 and ends.

Conversely, from block 920, if there is a non-expired OCSP response, the process proceeds to block 950 in which the ITS station may send the message generated at block 912 with the long-lived certificate having an OCSP staple. From block 950 the process proceeds to block 940 and ends.

A receiving ITS station, may then be able to determine whether the certificate of an incoming message has an OCSP staple. In particular, reference is now made to FIG. 10, which shows the process at a receiving ITS station. The process of FIG. 10 starts at block 1010 and proceeds to block 1012 in which the ITS station receives the V2X message.

The process then proceeds to block 1020 in which a check is made to determine whether the certificate has an OCSP staple. Details of the checking at block 1020 are provided below.

If the certificate does not have an OCSP staple, the process proceeds to block 1032 in which a check is made to determine whether the certificate is identified on the CRL. Specifically, the ITS station will periodically receive and store a CRL, and the check at block 1032 may be made against the CRL to determine whether the certificate is on it. Such checking may be done in accordance with the embodiments described above.

If the certificate is identified on the CRL then the process proceeds from block 1032 to block 1040 in which the V2X message is discarded. From block 1040 the process proceeds to block 1042 and ends.

Conversely, if the certificate is not on the CRL, the process proceeds from block 1032 to block 1050 in which a check is made to determine whether the certificate is verified and the message is correctly signed. If not, the process may proceed to block 1040 to discard the message and the process may then proceed to block 1042 and end.

From block 1050, if the certificate is verified and the message is correctly signed, then the V2X message may be passed to the application layer, shown at block 1060. From block 1060 the process proceeds to block 1042 and ends.

From block 1020, if the certificate has an OCSP staple then the process proceeds to block 1070 in which a check is made to determine whether the certificate is verified, including the OCSP staple, and the message is correctly signed. If no, then the process proceeds to block 1040 in which the message is discarded and to block 1042 in which the process ends.

Conversely, if the OCSP staple is valid and the message is correctly signed, as determined at block 1070, the process may proceed to block 1072 in which the message is passed to the application layer. From block 1072 the process proceeds to block 1042 and ends.

Therefore, in accordance with the above, an OCSP staple may be added to long-lived certificates, which may allow a receiving ITS station to avoid doing a CRL check for the received certificate.

The sending ITS station may receive an OCSP response for each of the certificates that it will use in a particular week. To do this, the sending ITS station may use a linkage value as an identifier. In this case, the OCSP response checks to see whether the linkage seed corresponds to a linkage value that appears on the CRL, and if it does not, then the OCSP responder can provide the OCSP response indicating that the certificate is good. Otherwise, the responder can provide a response indicating that the certificate is revoked or that the status of the certificate is unknown.

Similarly, if the HashID is used to obtain OCSP responses, the OCSP responder can check to see whether the HashID received from the ITS station corresponds to a HashID that appears on the CRL. If not, the responder can provide an OCSP response saying that the certificate is good. Otherwise, the responder could provide a response indicating that either the certificate is revoked or the status of the certificate is unknown.

Figure 11:
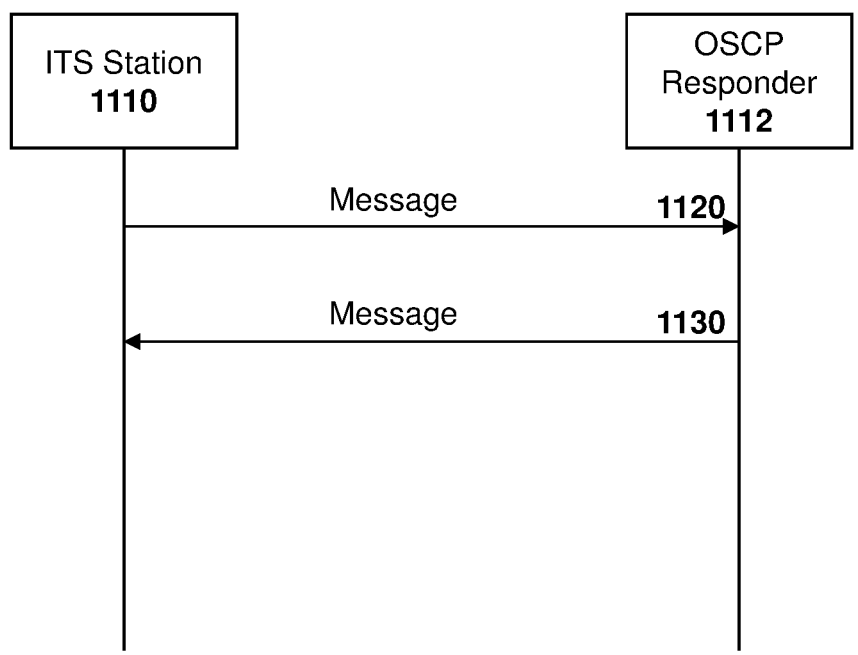
FIG. 11 is a data flow diagram showing an ITS station requesting and receiving from an OCSP responder the status of a certificate.

The check of the certificate with an OCSP responder is illustrated, for example, utilizing the embodiment of FIG. 11. In the embodiment of FIG. 11, the ITS station 1110 can send messages to an OCSP responder 1112.

In particular, the message from the ITS station may be message 1120 and the response generated by the OCSP Responder may be message 1130.

Message 1120 may contain the linkage value or the Hash ID for one or more certificates of the ITS station 1110, as described above.

Message 1130 may indicate whether the certificate is valid, revoked or the status of the certificate is unknown.

In one embodiment, message 1120 may for example be a request as defined in IETF RFC 6960, in section 2.1, and may be in the form provided in Table 3 below.

TABLE 3

Example OCSP Status Request

- protocol version
- service request
- target certificate identifier (e.g. Linkage value or HashID)
- optional extensions, which MAY be processed by the OCSP responder In Table 3 above, the bold insertion shows additional information which may be provided in the status request.

Further, message 1130 may be for example be a response as defined in IETF RFC 6960, in section 2.2, and may be in the form provided in Table 4 below.

TABLE 4

Example OCSP Status Response

The response for each of the certificates in a request consists of:
- target certificate identifier (e.g. Linkage value or HashID)
- certificate status value
- response validity interval
- optional extensions
This specification defines the following definitive response indicators for use in the certificate status value:
- good
- revoked
- unknown In Table 4 above, the bold insertion shows additional information which may be provided in the status response.

Time at Which OCSP Staples are Fetched

Figure 12:
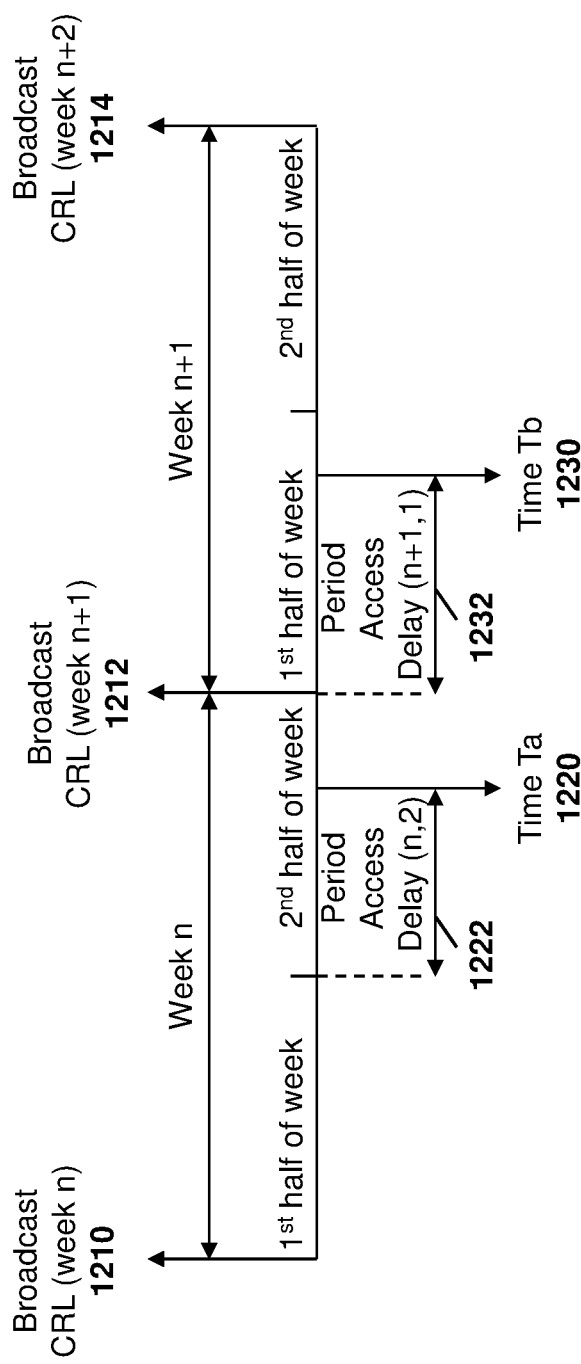
FIG. 12 is a timing diagram showing the timing for receiving OCSP staples in one example embodiment.
Figure 13:
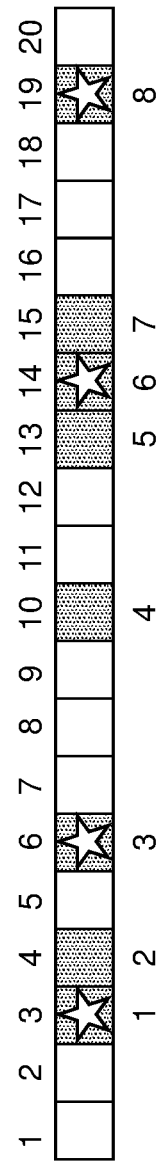
FIG. 13 is a block diagram showing a 20 minute window used to obtain OCSP staples.

OCSP Staples may be fetched in various ways. One example is provided below with regards to FIGS. 12 and 13. However, the embodiments of FIGS. 12 and 13 are merely provided for illustration, and other methods of obtaining OCSP staples could be used with the embodiments of the present disclosure.

Therefore, in accordance with one embodiment of the present disclosure, in fetching OCSP staples, various factors may be taken into account. One factor may be to prevent peaks in load on the OCSP Responder server. In this regard, the load on the OCSP Responder server caused by clients requesting OCSP staples may be spread over time.

A further factor would be to ensure that the maximum time a vehicle can remain misbehaving is no worse than that which occurs when staples are not used or cannot be accessed.

A further factor is to ensure that devices have plenty of time to gather OCSP staples, noting that wide area network (WAN) connectivity may be intermittent in time.

Therefore, reference is now made to FIG. 12, which illustrates the case where a CRL update is provided every seven days, and a maximum time that a vehicle can be misbehaving is therefore seven days.

As seen in FIG. 12, a CRL is broadcast at time 1210 for week n, at time 1212 for week n+1 and at time 1214 for week n+2. In this embodiment, a device has a 3.5 day window in the half week period prior to the start of week n+1 in which to obtain the OCSP responses for the 20 certificates that will be used in week n+1. However, these OCSP responses expire at the beginning of the second half of the week n+1. This expiration is achieved by the OCSP responder setting the 'response validity interval' in the OCSP response accordingly.

In this way, it can be ensured that a device will not be allowed to continue misbehaving for more than seven days from the time 1220 period that the OCSP response was obtained. In particular, at time 1220, a device may obtain OCSP staples for the 20 certificates of week n+1 with a validity period set to cover the first half of week n+1.

Further, there is also plenty of time for the device to obtain the OCSP staples prior to week n+1 starting. This may be achieved, for example, by obtaining a good WAN coverage opportunity.

By having an access delay 1222, the load of the OCSP server load can be spread over the 3½ days.

At some point in the first half of week n+1, the device again visits the OCSP responder to obtain a new batch of OCSP responses. The responses will be received assuming the certificates associated with the device have not been placed on the CRL. In this regard, the device will be issued with the new batch of OCSP responses with a 'response validity interval' set to be valid for the OCSP response expiring at the end of week n+1. Once again, a device may not be misbehaving for more than seven days from the time 1230 in which the second set of OCSP staples was received for week n+1. Further, the load on the OCSP responder can be spread over the 3.5 day period by using an access delay (n+1,1).

An ITS station receiving a certificate with the OCSP staple will not need to determine the validity period of the long-term certificate itself. Assuming that the OCSP staple is received within its validity period, then the certificate will also be within its validity period. As would be appreciated by those skilled in the art, the two validity periods, namely the validity period for the staple and the validity period for the certificate, are different.

If the ITS station receiving the V2X message receives an OCSP staple at a point in time which is not within the validity period of that OCSP staple, then the receiving device can take an action such as discarding the complete V2X message in some embodiments.

The device would obtain the period of the CRL issue and the time of the new CRL issue from the IssueDate and nextCRL fields in a CRL, as described for example the in IEEE 1609.2, section 7.3.2 Cr/Contents message. In this way, a device may determine the absolute time framework around which the present embodiment is based.

The access delay 1222 and the access delay 1232 are shown with respect to a half week boundary. One exemplary algorithm for determining at what specific times within the half week an ITS station should attempt to obtain certificates from an OCSP responder may be as follows.

An ITS station may build a historical record of the probability of having IP connectivity during any one minute interval in a relevant half of the week under consideration.

Referring to FIG. 13, a 20 minute window within the half week is shown. In practice this would be extended to the entire half week. In this regard, a label, from one to 20, may be added to each minute segment. Further, one minute intervals having a probability greater than Px of IP connectivity being available could also be labelled from 1 to N. For example, Px could be set to 0.4, indicating that a fairly good chance of IP connectivity being available over that one minute interval exists. Based on FIG. 13, such intervals are identified with shading and are numbered time intervals 1 to 8.

A pseudo random draw could then be made over N to determine a first set of one minute intervals during which an attempt to obtain certificates may be made. The pseudo random draw could be done, for example, by performing a modulo operation on the linkage value in the first certificate that will be in use that week. Therefore, the first attempt at obtaining certificates will occur at a time interval LinkageValue(1, n) mod N.

While the probability of successfully obtaining certificates is less than Py considering all possible access attempts, where Py may be set to a value such as 0.85, then random draws could continue to be made to select one minute periods during which the device will attempt to obtain OCSP responses. Each subsequent random draw could, for example, apply the modulo operation above, but using a different linkage value each time, taken from a different one of the 20 certificates that are applicable in a given week. The identified periods are shown with stars in the embodiment of FIG. 13.

For example, it may be assumed that the probability of IP connectivity being available in some time slots is greater than 0.4, as shown with the shaded squares in the embodiment of FIG. 13. For simplicity, in the present example the probability of IP connectivity in the shaded squares is set to exactly 0.4 in these periods.

Further, in the example, an 85% chance of success (Py=0.85) is desired in getting OCSP Responses at some point in this 20 time slot interval. In other words, a 15% chance of failure is acceptable in the example.

The test opportunities are shown with stars in the embodiment of FIG. 13. In this case, if only one access opportunity exists, then the chance of failure would be 6/10 (0.6). If two access opportunities were provided, then the chance of failure is 6/10*6/10=36/100 (0.36). If three access opportunities are provided, then the chance of failure is 6/10*6/10*6/10=216/1000 (0.216). If four access opportunities are provided, then the chance of failure is 6/10*6/10*6/10*6/10=1296/10,000 (0.1296).

Thus, with four access opportunities, there is less than a 15% chance of failure.

Therefore, the operation of the device in the example of FIG. 13 would be as follows. The device would attempt to obtain an OCSP response in timeslot 3. If successful, then the OCSP responses are obtained and the process would end.

If unsuccessful at the timeslot 3, the device would attempt to get OCSP responses at timeslot 6. If successful, then the OCSP responses are obtained and the process ends.

Otherwise, the process next attempts to obtain the OCSP responses at timeslot 14. If successful, the OCSP responses are obtained and the process ends. Otherwise the process would next attempt to obtain the OCSP responses at time slot 19.

In some embodiments, randomization of the time access within each one minutes time interval could also be used. This could again be performed using for example, a linkage value modulo Na, where the one minute interval is divided into Na subperiods. For example, Na may be 1000. This prevents multiple devices all attempting to access at the very beginning of the one minute time slot.

Figure 10:
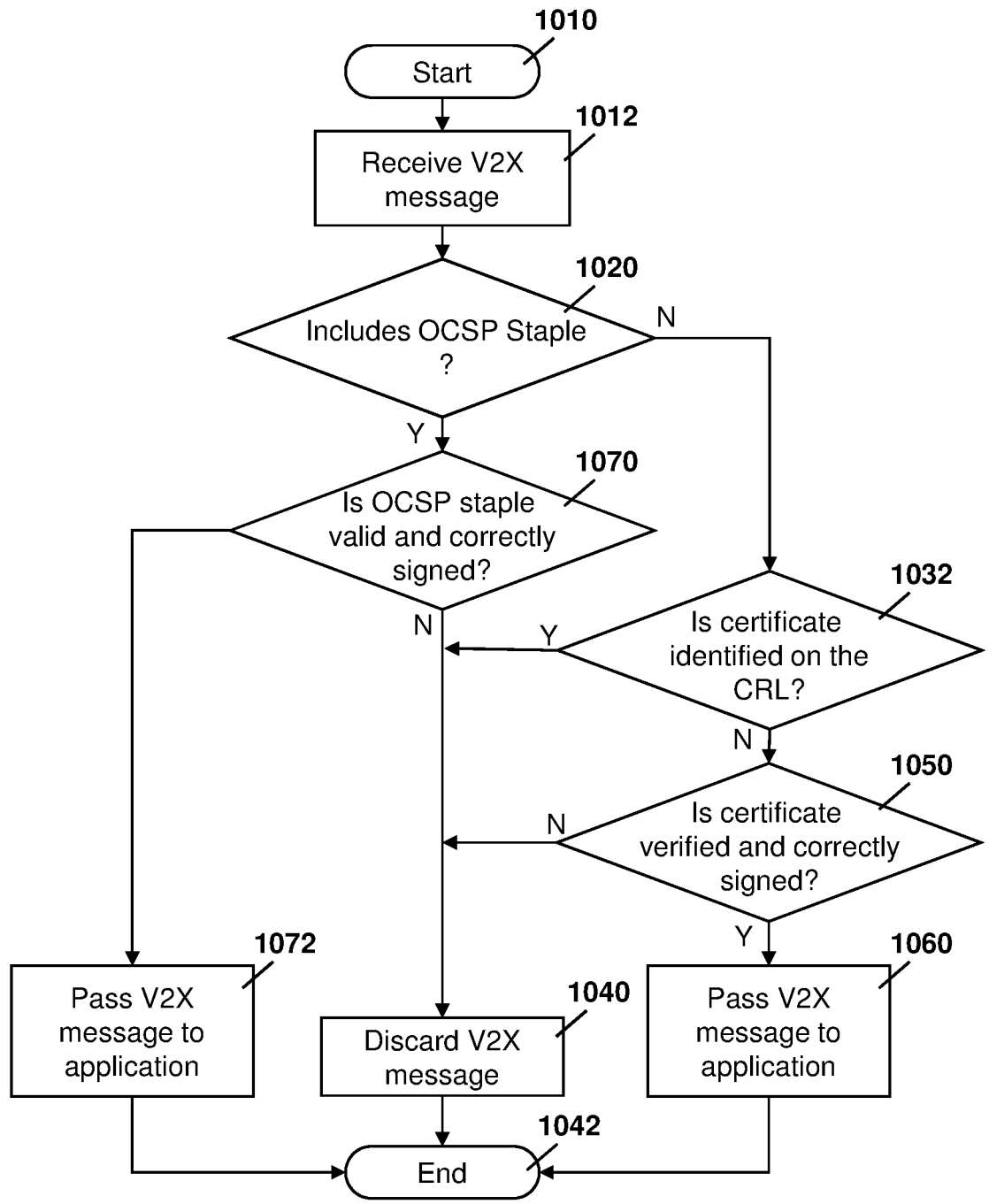
FIG. 10 is a process diagram showing a process at a receiving ITS station for determining whether to perform a CRL check on an incoming V2X message based on the presence of an OCSP staple.

Indication to a Receiver of a V2X Message that an OCSP Response is Present in the V2X Message In accordance with the embodiment of FIG. 10, a receiver of the V2X message needs to know whether there is an OCSP response stapled to it or not. This is used, for example, in the check at block 1020 of FIG. 10.

One option would be to create a new field, entitled "ocspStaple", which may be added to the ToBeSignedCertificate as specified in IEEE 1609.2. This field may indicate that an OCSP response may or may not be stapled to the certificate.

If a V2X receiver reads the certificate and determines that an OCSP Response may be stapled to the certificate, it can then determine whether an OCSP Response has or has not been stapled to the certificate. This could be done by specifying that the, for example, first x bytes of the part of the message, which for example follows the certificate are to take a particular value if an OCSP Response has been stapled to the certificate. The V2X receiver then reads the next x bytes following the certificate and determines whether an OCSP Response has been stapled to the certificate. The value x may be chosen to be sufficiently high that the probability of the sequence occurring by chance in a V2X message format in which there is no OCSP staple present is negligibly small.

As an alternative to reading the certificate and checking for the ocspStaple field before searching for the presence of an OCSP Response, one embodiment may instead look directly for the presence of an OCSP Response in a V2X message by looking for the specified x byte sequence in the V2X message. For example, this may be done using a correlation receiver based approach.

Therefore, in accordance with the embodiments above, an indication may be provided in a V2X message that a CRL check does not need to be performed. The indication may be the presence of a short-lived certificate, which may be indicated through various means, and may signify to a receiving ITS station that the certificate was recently obtained and therefore is still valid. In other embodiments, the indication may be an OCSP staple that is added to the certificate to provide an indication that no CRL check needs to be made.

As more vehicles become cellular connected and can obtain fresh short-lived certificates or OCSP staples, the processing and memory burden associated with performing a check against a CRL for the equipment that needs to receive V2X messages will be reduced.

Enabling a fallback mode of operation, wherein a vehicle can transmit long-lived certificates in situations where it has been unable to obtain the required daily or weekly cellular or Wi-Fi connectivity to gather either short-term certificates or short-lived OCSP responses, allows for flexibility in the solution.

Further, when utilizing short-lived certificates, there is backwards compatibility where a long-lived certificate approach is deployed in the first generation of ITS stations. In this case, both long-lived certificates and short-lived certificates can be supported in a second-generation dual-mode ITS station. Specifically, first generation single mode ITS stations can still process short-lived certificates.

The use of short-lived certificates, where possible, solves another problem for a message receiving vehicle which can occur when long-lived certificates are used. This problem that can occur is that if the receiving vehicle has been unable to obtain up-to-date CRL, then it has two options available, both of which have downsides. Either the vehicle must discard the received messages, which reduces usefulness of the ITS system, or else the received message is used, but this comes with the risk that the message may actually be untrustworthy.

The ITS stations and network elements described above may be any computing device or network node. Such computing device or network node may include any type of electronic device, including but not limited to, mobile devices such as smartphones or cellular telephones. Examples can further include fixed or mobile user equipment, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 14:
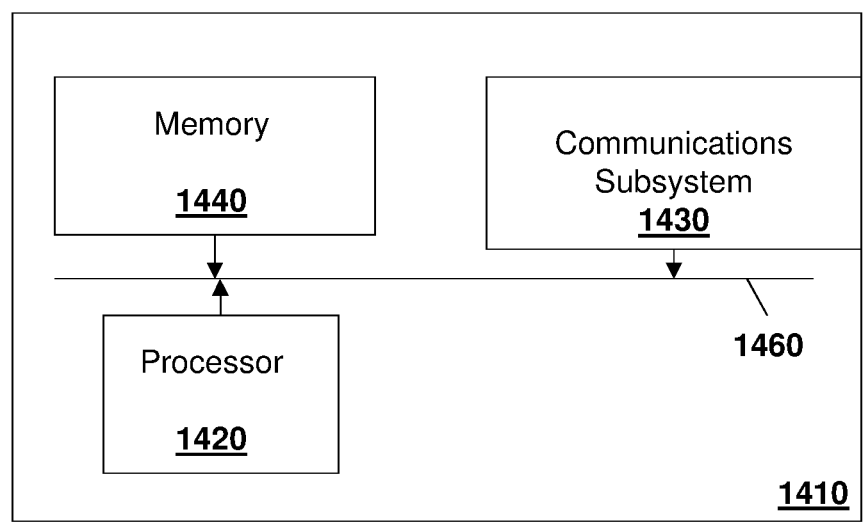
FIG. 14 is a block diagram of an example computing device capable of being used with the embodiments of the present disclosure.

One simplified diagram of a computing device is shown with regard to FIG. 14. The computing device of FIG. 14 could be any mobile device, portable device, network node, ITS station, server, or other node as described above.

In FIG. 14, device 1410 includes a processor 1420 and a communications subsystem 1430, where the processor 1420 and communications subsystem 1430 cooperate to perform the methods of the embodiments described above. Communications subsystem 1420 may, in some embodiments, comprise multiple subsystems, for example for different radio technologies.

Processor 1420 is configured to execute programmable logic, which may be stored, along with data, on device 1410, and shown in the example of FIG. 14 as memory 1440. Memory 1440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1440, device 1410 may access data or programmable logic from an external storage medium, for example through communications subsystem 1430.

Communications subsystem 1430 allows device 1410 to communicate with other devices or network elements and may vary based on the type of communication being performed. Further, communications subsystem 1430 may comprise a plurality of communications technologies, including any wired or wireless communications technology.

Communications between the various elements of device 1410 may be through an internal bus 1460 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations. Further, the clauses below also provide for aspects of the present disclosure.

AA. A method at a computing device within an Intelligent Transportation System, the method comprising: receiving a message signed with a certificate;
checking for an indication within the message; and inspecting a Certificate Revocation List for the certificate only when the indication is absent from the message.

BB. A method at a computing device within an Intelligent Transportation System for sending a message, the method comprising: determining, at the computing device, whether an Online Certificate Status Protocol (OCSP) staple is available for a signing certificate at the computing device; if the OCSP staple is available: including the OCSP staple with in the message; if the OCSP staple is not available, signing the message with the certificate and without the OCSP staple; and sending the message to a recipient.

CC. A method at a network element in an Intelligent Transportation System, the method comprising: determining that a computing device having at least one short-term certificate and at least one long term certificate has been blacklisted for the at least one short-term certificate or the at least one long term certificate; and blacklisting the other of the at least one short-term certificate or the at least one long term certificate.

DD. A method at a computing device in an Intelligent Transportation System, the computing device having at least one short-term certificate and at least one long term certificate, the method comprising: determining that one of the at least one short-term certificate and at least one long term certificate has been blacklisted; and preventing communication from the computing device using the other of the at least one short-term certificate and the at least one long term certificate.

EE. A method at a computing device for obtaining an Online Certificate Status Protocol (OCSP) staple, the method comprising: finding a plurality of candidate time slots during which a probability of a network connection exceeds a threshold; randomly choosing a set from the plurality of candidate time slots, the set containing a subset of the candidate time slots such that a probability of successfully obtaining certificates during the set exceeds a second threshold; and progressively attempting to obtain OCSP staples during the candidate time slots within the set.

FF. The method of clause EE, wherein the randomly choosing is performed using a modulo operation on a linkage value in a certificate on the computing device.

GG. The method of clause EE, wherein the obtaining is performed within a period which is half the period at which a CRL is issued.

HH. The method of clause EE, wherein the attempting occurs during a random time within a selected candidate timeslot.

The invention claimed is:

1. A method at a computing device within a vehicle in an Intelligent Transportation System, wherein the Intelligent Transportation System is designed to enhance road safety and road efficiency, the method comprising:
receiving, at the computing device, a message from a second vehicle;
determining that the message is correctly signed with a private key of a certificate for the second vehicle and that a valid Online Certificate Status Protocol (OCSP) response is appended to the message;
based on the determining, passing the message to an application layer at the computing device without performing a Certificate Revocation List (CRL) check on the certificate.

2. The method of claim 1, wherein the certificate is a long-term certificate for the computing device.

3. The method of claim 1, wherein the OCSP response is valid if the OCSP response has a validity period that has not expired.

4. The method of claim 1, wherein the OCSP response is valid if the OCSP response is correctly signed.

5. The method of claim 1, wherein the valid OCSP response provides an indication that the certificate was recently checked against a certificate revocation list and that the certificate does not need to be checked by computing device.

6. The method of claim 1, wherein the certificate with the appended OCSP response is received with the message.

7. The method of claim 1, further comprising assuming a validity period for the certificate has not expired based on the presence of the valid OSCP response.

8. The method of claim 1, further comprising:
checking, prior to the determining, whether the message contains an OCSP response, and
when the message contains no OCSP response, performing a CRL check on the message.

9. The method of claim 1, wherein the message is at least one of a European Telecommunications Standards Institute (ETSI) Cooperative Awareness Message (CAM); an ETSI Decentralized Environmental Notification Message (DENM); and a Dedicated Short Range Communications (DSRC)/Wireless Access In Vehicular Environments (WAVE) system Basic Safety Message.

10. A computing device within an Intelligent Transportation System, the computing device comprising:
a processor; and
a communications subsystem,
wherein the computing device is configured to:
receive a message from a second vehicle;
determine that the message is correctly signed with a private key of a certificate for the second vehicle and that a valid Online Certificate Status Protocol (OCSP) response is appended to the message;
based on the determination, pass the message to an application layer at the computing device without performing a Certificate Revocation List (CRL) check on the certificate.

11. The computing device of claim 10, wherein the certificate is a long-term certificate for the computing device.

12. The computing device of claim 10, wherein the OCSP response is valid if the OCSP response has a validity period that has not expired.

13. The computing device of claim 10, wherein the OCSP response is valid if the OCSP response is correctly signed.

14. The computing device of claim 10, wherein the valid OCSP response provides an indication that the certificate was recently checked against a certificate revocation list and that the certificate does not need to be checked by computing device.

15. The computing device of claim 10, wherein the certificate with the appended OCSP response is received with the message.

16. The computing device of claim 10, wherein the computing device is further configured to assume a validity period for the certificate has not expired based on the presence of the valid OSCP response.

17. The computing device of claim 10, wherein the computing device is further configured to:
   check, prior to the determination, whether the message contains an OCSP response, and
   when the message contains no OCSP response, perform a CRL check on the message.

18. The computing device of claim 10, wherein the message is at least one of a European Telecommunications Standards Institute (ETSI) Cooperative Awareness Message (CAM); an ETSI Decentralized Environmental Notification Message (DENM); and a Dedicated Short Range Communications (DSRC)/Wireless Access In Vehicular Environments (WAVE) system Basic Safety Message.

19. A non-transitory computer readable medium for storing instruction code, which, when executed by a processor of a computing device within an Intelligent Transportation System cause the computing device to:
   receive a message from a second vehicle;
   determine that the message is correctly signed with a private key of a certificate for the second vehicle and that a valid Online Certificate Status Protocol (OCSP) response is appended to the message;
   based on the determination, pass the message to an application layer at the computing device without performing a Certificate Revocation List (CRL) check on the certificate.

20. The non-transitory computer readable medium of claim 19, wherein the certificate is a long-term certificate for the computing device.

* * * * *